(12) United States Patent
von Krogh

(10) Patent No.: US 10,778,671 B2
(45) Date of Patent: *Sep. 15, 2020

(54) TOKEN DEVICE RE-SYNCHRONIZATION THROUGH A NETWORK SOLUTION

(71) Applicant: eBay Inc., San Jose, CA (US)

(72) Inventor: Christopher Jurgen von Krogh, San Jose, CA (US)

(73) Assignee: eBAY INC., San Jose, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/110,302

(22) Filed: Aug. 23, 2018

(65) Prior Publication Data

US 2018/0367531 A1      Dec. 20, 2018

Related U.S. Application Data

(63) Continuation of application No. 15/619,755, filed on Jun. 12, 2017, now Pat. No. 10,084,774, which is a
(Continued)

(51) Int. Cl.
*H04L 29/06* (2006.01)
*G06F 21/34* (2013.01)
(Continued)

(52) U.S. Cl.
CPC .......... *H04L 63/0838* (2013.01); *G06F 21/34* (2013.01); *G06F 21/445* (2013.01);
(Continued)

(58) Field of Classification Search
CPC . H04L 63/0838; H04L 63/102; H04L 63/083; H04L 9/0863; H04L 9/321;
(Continued)

(56) References Cited

U.S. PATENT DOCUMENTS 6,105,133 A    8/2000  Fielder et al.
7,904,946 B1   3/2011  Chu et al.
(Continued)

FOREIGN PATENT DOCUMENTS

GB         2434663 A       8/2007
WO     2006/062838 A1      6/2006

OTHER PUBLICATIONS

Dhamija, Deja Vu: A User Study Using Images for Authentication, Proceedings of the 9th USENIX Security Symposium, Aug. 14-17, 2000 (Year: 2000).*
(Continued)

*Primary Examiner* — John B King
(74) *Attorney, Agent, or Firm* — Shook, Hardy & Bacon L.L.P.

(57) ABSTRACT

Example embodiments provide two-way authentication. A computing device accesses a server of a site. In response to the accessing, a list of token values including a first token value generated by an authentication server is received. The computing device displays the list of token values, whereby the list of token values is compared to a first token value associated with the computing device to determine whether the first token value associated with the computing device is in the list. A match in the first token value associated with the computing device to the first token value in the list provides authentication of the server of the site at the computing device. A second token value associated with the computing device is received in response to the match. The second token value associated with the computing device is transmitted and used to authenticate a user at the server of the site.

20 Claims, 12 Drawing Sheets

Related U.S. Application Data continuation of application No. 15/195,431, filed on Jun. 28, 2016, now Pat. No. 9,680,825, which is a continuation of application No. 14/015,895, filed on Aug. 30, 2013, now Pat. No. 9,398,003, which is a continuation of application No. 11/620,321, filed on Jan. 5, 2007, now Pat. No. 8,543,829.

(51) Int. Cl.
　　　*G06F 21/44*　　　(2013.01)
　　　*H04L 9/08*　　　(2006.01)
　　　*H04L 9/32*　　　(2006.01)

(52) U.S. Cl.
　　　CPC ............ *H04L 9/0863* (2013.01); *H04L 9/321* (2013.01); *H04L 9/3228* (2013.01); *H04L 9/3234* (2013.01); *H04L 63/083* (2013.01); *H04L 63/102* (2013.01); *G06F 2221/2119* (2013.01); *H04L 63/0442* (2013.01); *H04L 2209/56* (2013.01); *H04L 2209/80* (2013.01)

(58) Field of Classification Search
　　　CPC . H04L 9/3228; H04L 9/3234; H04L 63/0442; H04L 2209/56; H04L 2209/80; G06F 21/34; G06F 21/445; G06F 2221/2119
　　　See application file for complete search history.

(56) References Cited

U.S. PATENT DOCUMENTS

| | | |
|---|---|---|
| 8,281,375 B2 | 10/2012 | Von Krogh |
| 8,543,829 B2 | 9/2013 | Von Krogh |
| 8,973,114 B2 | 3/2015 | Von Krogh |
| 9,398,003 B2 | 7/2016 | Von Krogh |
| 9,479,497 B2 | 10/2016 | Von Krogh |
| 9,680,825 B2 | 6/2017 | Von Krogh |
| 10,084,774 B2 | 9/2018 | Von Krogh |
| 2001/0037451 A1 | 11/2001 | Bhagavatula et al. |
| 2003/0105964 A1 | 6/2003 | Brainard et al. |
| 2005/0204209 A1 | 9/2005 | Vataja |
| 2006/0080545 A1 | 4/2006 | Bagley |
| 2006/0094403 A1 | 5/2006 | Norefors et al. |
| 2006/0174113 A1 | 8/2006 | Zahari |
| 2006/0200855 A1 | 9/2006 | Willis |
| 2006/0219776 A1 | 10/2006 | Finn |
| 2007/0005955 A1 | 1/2007 | Pyle et al. |
| 2007/0061566 A1 | 3/2007 | Bailey et al. |
| 2007/0101152 A1 | 5/2007 | Mercredi et al. |
| 2007/0130472 A1 | 6/2007 | Buer et al. |
| 2007/0130474 A1 | 6/2007 | Shatford |
| 2007/0174904 A1 | 7/2007 | Park |
| 2008/0034216 A1 | 2/2008 | Law |
| 2008/0168543 A1 | 7/2008 | Von Krogh |
| 2008/0168544 A1 | 7/2008 | Von Krogh |
| 2013/0014237 A1 | 1/2013 | Krogh |
| 2013/0347093 A1 | 12/2013 | Von Krogh |
| 2015/0172282 A1 | 6/2015 | Von Krogh |
| 2016/0308857 A1 | 10/2016 | Von Krogh |
| 2017/0279796 A1 | 9/2017 | Von Krogh |

OTHER PUBLICATIONS

Response to Pre-Interview Communication filed on Jun. 12, 2015, for U.S. Appl. No. 14/632,332, dated May 27, 2015, 3 pages.
Pre-Interview First Office Action received for U.S. Appl. No. 15/195,431, dated Sep. 21, 2016, 3 pages.
Notice of Allowance received for U.S. Appl. No. 15/195,431, dated Feb. 10, 2017, 15 pages.
Preliminary Amendment for U.S. Appl. No. 15/195,431, dated Jun. 29, 2016, 8 pages.
Response to Pre-interview Communication filed on Oct. 14, 2016, for U.S. Appl. No. 15/195,431, dated Sep. 21, 2016, 9 pages.
Sherman, "Charge Your Battery Faster by Using a USB Port", Power Electronics Technology, Retreived from Internet URL: <www.powerelectronics.com>, Jan. 2004, pp. 34-40.
Raihi et al., "HOTP: An HMAC-Based One-Time Password Algorithm Network", Working Group, RFC #4226, Dec. 2005, 37 pages.
Examiner Initiated Interview Summary received for U.S. Appl. No. 13/616,894, dated Oct. 28, 2014, 1 page.
First action interview—Office Action received for U.S. Appl. No. 14/632,332, dated Jul. 9, 2015, 8 pages.
Examiner initiated interview summary received for U.S. Appl. No. 15/195,431, dated Feb. 10, 2017, 1 page.
Examiner Initiated Interview Summary received for U.S. Appl. No. 15/619,755, dated May 18, 2018, 1 page.
Pre-Interview first office action received for U.S. Appl. No. 15/619,755, dated Mar. 5, 2018, 3 pages.
Notice of Allowance received for U.S. Appl. No. 15/619,755, dated May 18, 2018, 12 pages.
Preliminary Amendment filed for U.S. Appl. No. 15/619,755, dated Jun. 16, 2017, 8 pages.
Response to Pre Interview Communication filed on Apr. 4, 2018, for U.S. Appl. No. 15/619,755, dated Mar. 5, 2018, 4 pages.
"Deepnet Mobile 2x2 Deepnet Security, Ltd", 2006, pp. 1-2.
Advisory Action received for U.S. Appl. No. 11/620,286, dated Jan. 19, 2011, 3 Pages.
Decision on Pre-Appeal Brief Request received for U.S. Appl. No. 11/620,286, mailed on Feb. 1, 2012, 2 Pages.
Examiner Initiated Interview Summary received for U.S. Appl. No. 11/620,286, dated Jan. 30, 2012, 2 Pages.
Final Office Action received for U.S. Appl. No. 11/620,286, dated Aug. 31, 2011, 35 pages.
Final Office Action received for U.S. Appl. No. 11/620,286, dated Nov. 5, 2010, 22 pages.
Non-Final Office Action received for U.S. Appl. No. 11/620,286 dated Apr. 28, 2010, 26 pages.
Non-Final Office Action received for U.S. Appl. No. 11/620,286, dated Sep. 21, 2009, 14 pages.
Non-Final Office Action received for U.S. Appl. No. 11/620,286, dated Feb. 25, 2011, 24 pages.
Notice of Allowance received for U.S. Appl. No. 11/620,286 dated Feb. 8, 2012, 18 pages.
Notice of Allowance received for U.S. Appl. No. 11/620,286, dated Jun. 1, 2012, 5 pages.
Pre Appeal Brief Request for U.S. Appl. No. 11/620,286, filed Nov. 30, 2011, 5 pages.
Response to Final Office Action filed on Jan. 5, 2011, for U.S. Appl. No. 11/620,286, dated Nov. 5, 2010, 11 pages.
Response to Non- Final Office Action filed on Jan. 21, 2010, for U.S. Appl. No. 11/620,286, dated Sep. 21, 2009, 20 pages.
Response to Non-Final Office Action filed on Aug. 30, 2010, for U.S. Appl. No. 11/620,286, dated Apr. 28, 2010, 11 pages.
Response to Non-Final Office Action filed on May 25, 2011 for U.S. Appl. No. 11/620,286, dated Feb. 25, 2011, 10 pages.
Advisory Action received for U.S. Appl. No. 11/620,321, dated Jun. 28, 2010, 3 pages.
Final Office Action received for U.S. Appl. No. 11/620,321, dated Apr. 5, 2010, 23 pages.
Final Office Action received for U.S. Appl. No. 11/620,321, dated Jan. 30, 2012, 31 pages.
Final Office Action received for U.S. Appl. No. 11/620,321, dated Mar. 17, 2011, 26 pages.
Non-Final Office Action received for U.S. Appl. No. 11/620,321, dated Aug. 4, 2011, 29 pages.
Non-Final Office Action received for U.S. Appl. No. 11/620,321, dated Sep. 1, 2010, 21 pages.
Non-Final Office Action received for U.S. Appl. No. 11/620,321, dated Sep. 21, 2009, 25 pages.
Notice of Allowance received for U.S. Appl. No. 11/620,321, dated May 24, 2013, 14 pages.
Response to Advisory Action filed on Jul. 6, 2010, for U.S. Appl. No. 11/620,321, dated Jun. 28, 2010, 12 pages.
Response to Final Office Action filed on Apr. 30, 2012, for U.S. Appl. No. 11/620,321, dated Jan. 30, 2012, 13 pages.

(56) References Cited

OTHER PUBLICATIONS

Response to Final Office Action filed on Jun. 7, 2010, for U.S. Appl. No. 11/620,321, dated Apr. 5, 2010, 15 Pages.
Response to Final Office Action filed on Jun. 9, 2011, for U.S. Appl. No. 11/620,321, dated Mar. 17, 2011, 13 pages.
Response to Non- Final Office Action filed on Dec. 23, 2010, for U.S. Appl. No. 11/620,321, dated Sep. 1, 2010, 11 pages.
Response to Non-Final Office Action filed on Dec. 23, 2009, for U.S. Appl. No. 11/620,321, dated Sep. 21, 2009, 27 pages.
Response to Non-Final Office Action filed on Nov. 2, 2011, for U.S. Appl. No. 11/620,321, dated Aug. 4, 2011, 13 pages.
Response to Non-Final Office Action filed on Aug. 28, 2013, for U.S. Appl. No. 13/616,894, dated Jun. 3, 2013, 9 pages.
Final Office Action received for U.S. Appl. No. 13/616,894, dated Dec. 11, 2013, 20 pages.
Non-Final Office Action received for U.S. Appl. No. 13/616,894, dated Jun. 3, 2013, 21 pages.
Notice of Allowance received for U.S. Appl. No. 13/616,894, dated Oct. 28, 2014, 14 pages.
Preliminary Amendment received for U.S. Appl. No. 13/616,894, filed Oct. 11, 2012, 6 pages.
Response to Final Office Action filed on Apr. 11, 2014, for U.S. Appl. No. 13/616,894, dated Dec. 11, 2013, 11 pages.
Response to Non-Final Office Action filed on Dec. 14, 2015, for U.S. Appl. No. 14/015,895, dated Aug. 14, 2015, 17 pages.
Non-Final Office Action received for U.S. Appl. No. 14/015,895, dated Aug. 14, 2015, 9 pages.
Non-Final Office Action received for U.S. Appl. No. 14/015,895, dated Jan. 30, 2015, 21 pages.
Notice of Allowance received for U.S. Appl. No. 14/015,895, dated Mar. 21, 2016, 9 pages.
Notice of Allowance received for U.S. Appl. No. 14/015,895, dated Jan. 20, 2016, 13 pages.
Preliminary Amendment for U.S. Appl. No. 14/015,895, filed Oct. 3, 2013, 8 pages.
Response to Non-Final Office Action filed on Apr. 30, 2015, for U.S. Appl. No. 14/015,895, dated Jan. 30, 2015, 12 pages.
Final Office Action received for U.S. Appl. No. 14/632,332, dated Dec. 10, 2015, 12 pages.
Notice of Allowance received for U.S. Appl. No. 14/632,332, dated Jul. 1, 2016, 10 pages.
Pre-Interview First Office Action received for U.S. Appl. No. 14/632,332, dated May 27, 2015, 5 pages.
Preliminary Amendment for U.S. Appl. No. 14/632,332, filed Feb. 27, 2015, 8 pages.
Response First Action Interview Office Action Summary filed on Sep. 9, 2015, for U.S. Appl. No. 14/632,332, dated Jul. 9, 2015, 11 pages.
Response to Final Office Action filed on Mar. 10, 2016, for U.S. Appl. No. 14/632,332, dated Dec. 10, 2015, 12 pages.
U.S. Appl. No. 11/620,286 now U.S. Pat. No. 8,281,375, filed Jan. 5, 2007, One Time Password Authentication of Websites.
U.S. Appl. No. 13/616,894 now U.S. Pat. No. 8,973,114, filed Sep. 14, 2012, One Time Password Authentication of Websites.
U.S. Appl. No. 14/632,332 now U.S. Pat. No. 9,479,497, filed Feb. 26, 2015, One Time Password Authentication of Websites.
U.S. Appl. No. 11/620,321 now U.S. Pat. No. 8,543,829, filed Jan. 5, 2007, Token Device Re-Synchronization Through a Network Solution.
U.S. Appl. No. 14/015,895 now U.S. Pat. No. 9,398,003, filed Aug. 30, 2013, Token Device Re-Synchronization Through a Network Solution.
U.S. Appl. No. 15/195,431 now U.S. Pat. No. 9,680,825, filed Jun. 28, 2016, Token Device Re-Synchronization Through a Network Solution.
U.S. Appl. No. 15/619,755 now U.S. Pat. No. 10,084,774, filed Jun. 12, 2017, Token Device Re-Synchronization Through a Network Solution.

* cited by examiner

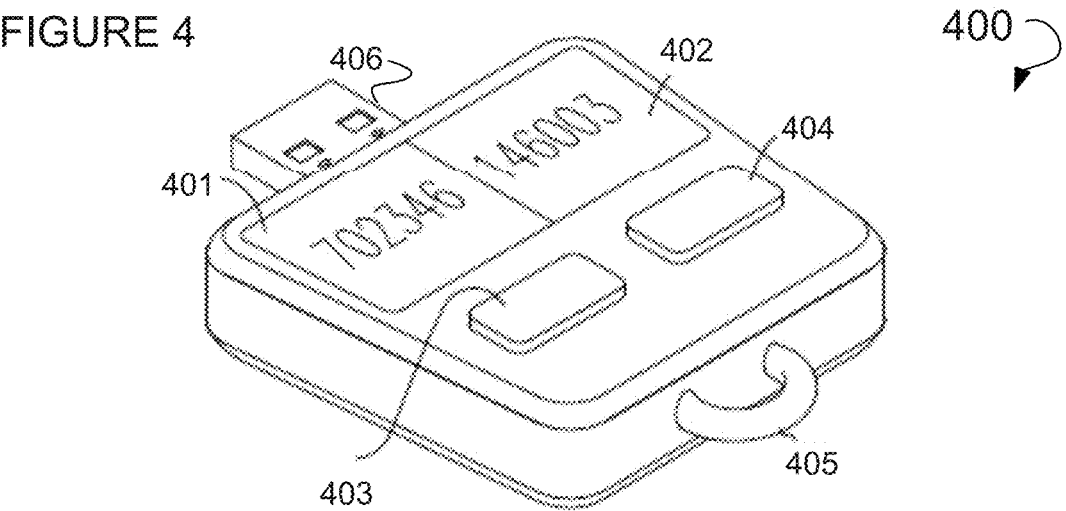
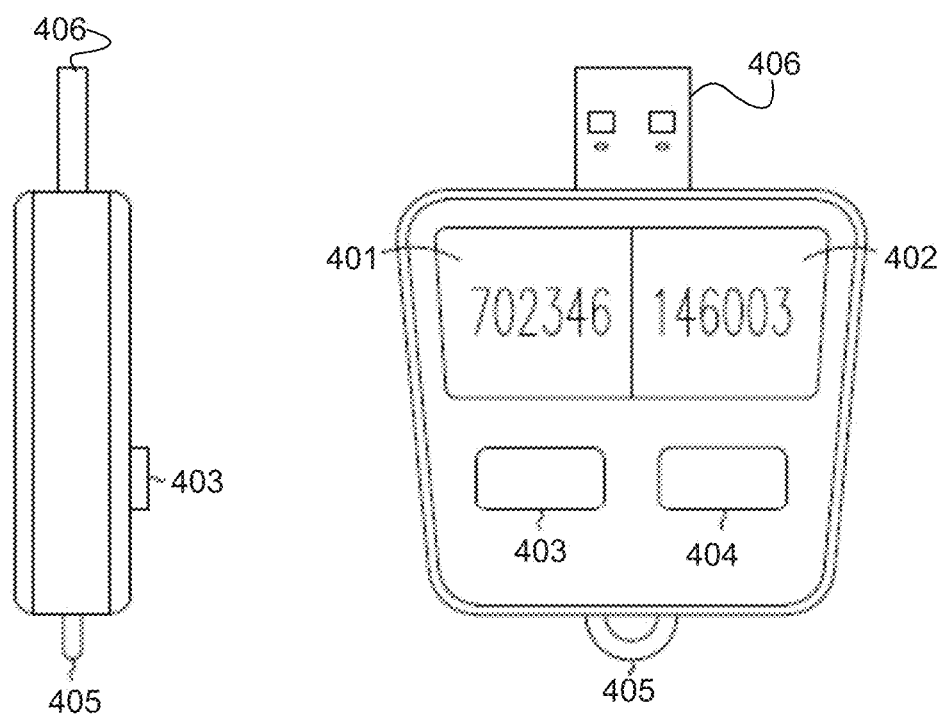
FIGURE 4

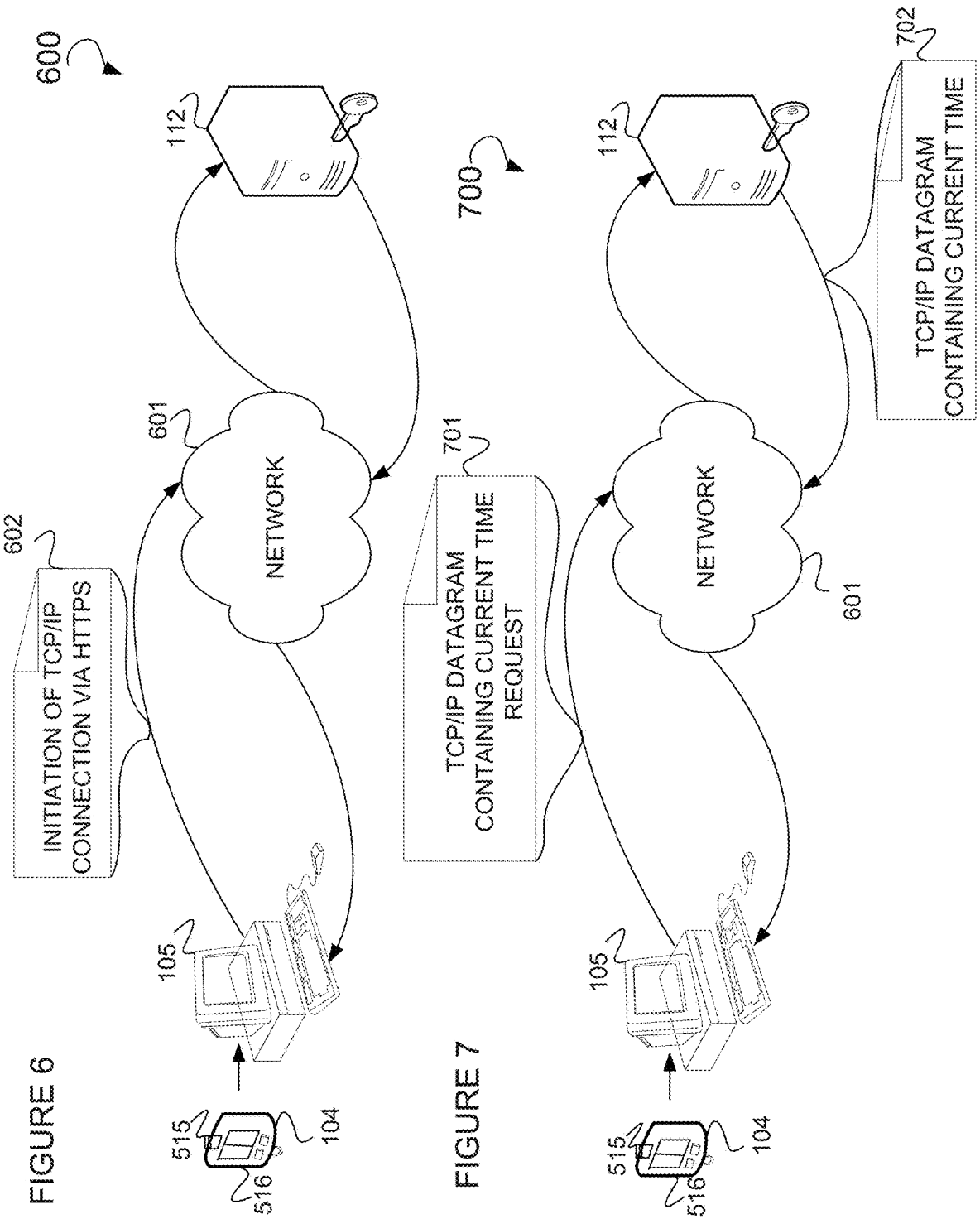

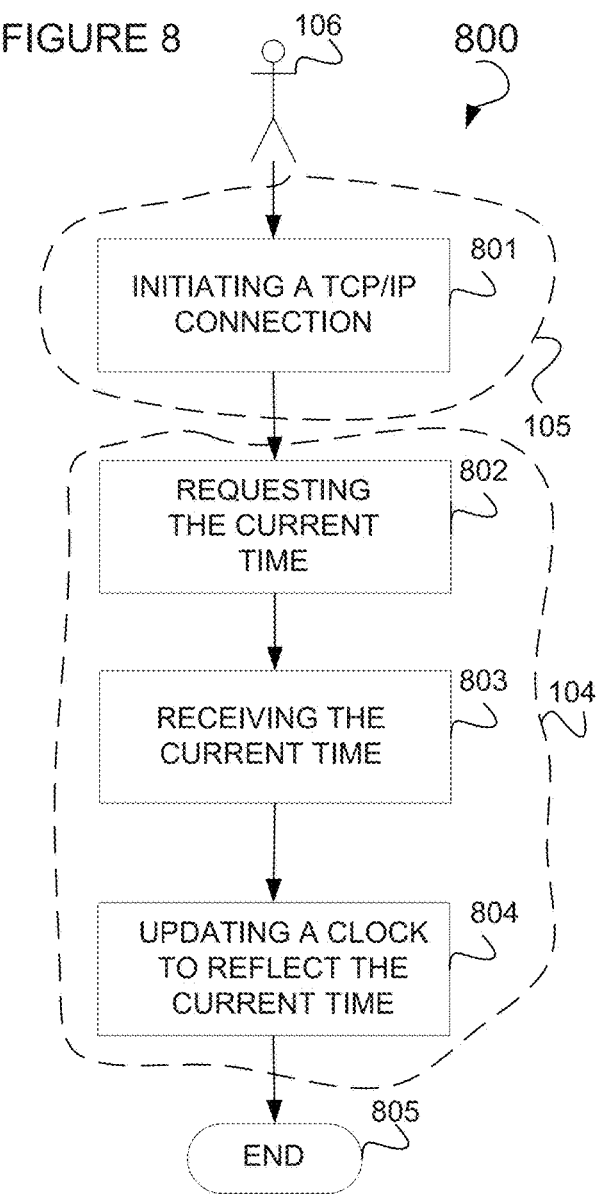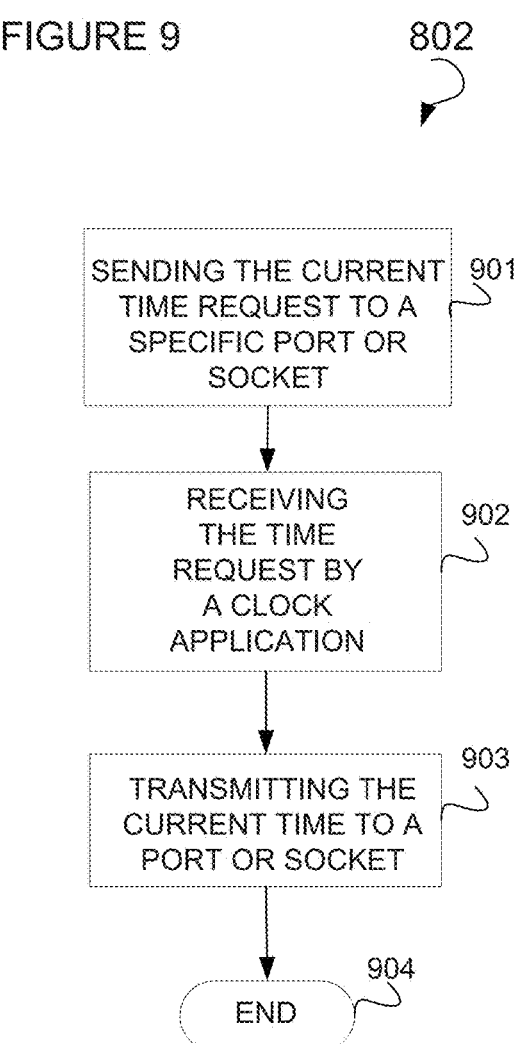

TOKEN DEVICE RE-SYNCHRONIZATION THROUGH A NETWORK SOLUTION

CROSS REFERENCE TO RELATED APPLICATIONS

This application is a continuation of and claims the benefit of priority to U.S. patent application Ser. No. 15/619,755, filed Jun. 12, 2017, which is a continuation of and claims the benefit of priority to U.S. patent application Ser. No. 15/195, 431, filed on Jun. 28, 2016, which is a continuation of U.S. patent application Ser. No. 14/015,895, filed on Aug. 30, 2013, now U.S. Pat. No. 9,398,003, which is a continuation of U.S. patent application Ser. No 11/620,321 filed Jan. 5, 2007, now U.S. Pat. No. 8,543,829, each of which are hereby incorporated by reference in their entirety.

TECHNICAL FIELD

The present application relates generally to the technical field of online security and, in one specific example, the use of a double One-Time-Password (OTP) token in the course of authenticating a user and a website during the course of conducting online transactions.

BACKGROUND

OTP tokens are used to verify the identity of a user of, for example, an e-commerce site, banking site, or other site that requires verification. The verification operation works by taking password values from two separate but synchronized clocks, and comparing these values. In some instances, a clock may reside on a hand held device, while a second clock may reside on a third-party authentication server. This type of verification uses passwords based upon clocks or "Synchronized One-Time Passwords." The hand held devices can include devices such as key fobs, Personal Digital Assistants (PDA), or cell phones. The time synchronized passwords are known as tokens, or OTP tokens.

OTP tokens are commonly used to verify the identity of the holder of the security token. For example, in the e-commerce context, the holder of an OTP token value may use this token to verify their identity, and once this identity is verified, the holder is able to purchase goods and services from the site. While OTP tokens are effective at verifying the identity of the token holder, they are not effective at verifying the identity of, for example, the site with which the token holder is transacting business. This type of verification is necessary in cases of, for example, phishing attacks and other types of e-commerce fraud. Phishers attempt to fraudulently acquire sensitive information, such as passwords and credit card details, by masquerading as a trustworthy person or business in an electronic communication. Phishing is typically carried out using email or an instant message.

BRIEF DESCRIPTION OF THE DRAWINGS

Some embodiments are illustrated by way of example and not limitation in the figures of the accompanying drawings in which:

FIG. 4 shows a perspective, side and front views of an example dual OTP key fob.

FIG. 6 is a network diagram describing the initiation of a Transmission Control Protocol/Internet Protocol connection by a dual OTP token device with a secured verification site.

FIG. 7 is a network diagram illustrating the updating of a clock time on a dual OTP token device.

FIG. 8 is a flow chart illustrating an example method applied in the updating of a clock time on a dual OTP token device.

FIG. 9 is a flowchart illustrating the various sub-modules make up an example method underlying the above described module.

DETAILED ILLUSTRATION

Example methods and systems to further online security are described. In the following illustration, for purposes of explanation, numerous specific details are set forth in order to provide a thorough understanding of example embodiments. It is evident, however, to one skilled in the art that the present invention may be practiced without these specific details.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning is clear from its use in the context of the illustration.

In some embodiments, a user (e.g., Alice) utilizes a double OTP token device that has one or more buttons to generate one or more OTP tokens. In one embodiment, this dual OTP token device is, in effect, two entirely separate security keys contained in one device. As is more fully described below, these tokens, however, are generated using the same internal clock. The operation for using this double OTP token device can be described as follows. Alice goes to a secure site such as EBAY™ (e.g., www.ebay.com). She enters her username and password on the site's main page. The site verifies the credentials and sends a request to a third-party authentication site such as, for example, VERISIGN™, for what is Alice's first current OTP token value. The third-party authentication site returns a value (e.g., 123456). The site presents this value to Alice, along with some other six-digit randomly chosen numbers, along with a message requesting Alice to obtain a token value from her dual OTP token device (e.g., Alice need to press the black button on her device). Alice obtains the value and sees 123456. Alice verifies that this number appears in the list of numbers displayed by the site. Next, Alice obtains the second OTP token value by, for example, pressing the white button. Once this value is obtained, she enters it into a text box or other input object/widget on the site's web page. The site then sends this value to the third-party authentication site for verification. If the second token value is verified, then the third-party authentication site returns a "yes" indication to the site, and Alice is free to transact business with the site. As is discussed more fully below, the use of these two tokens is an example of a two-factor-authentication system.

Figure 1:
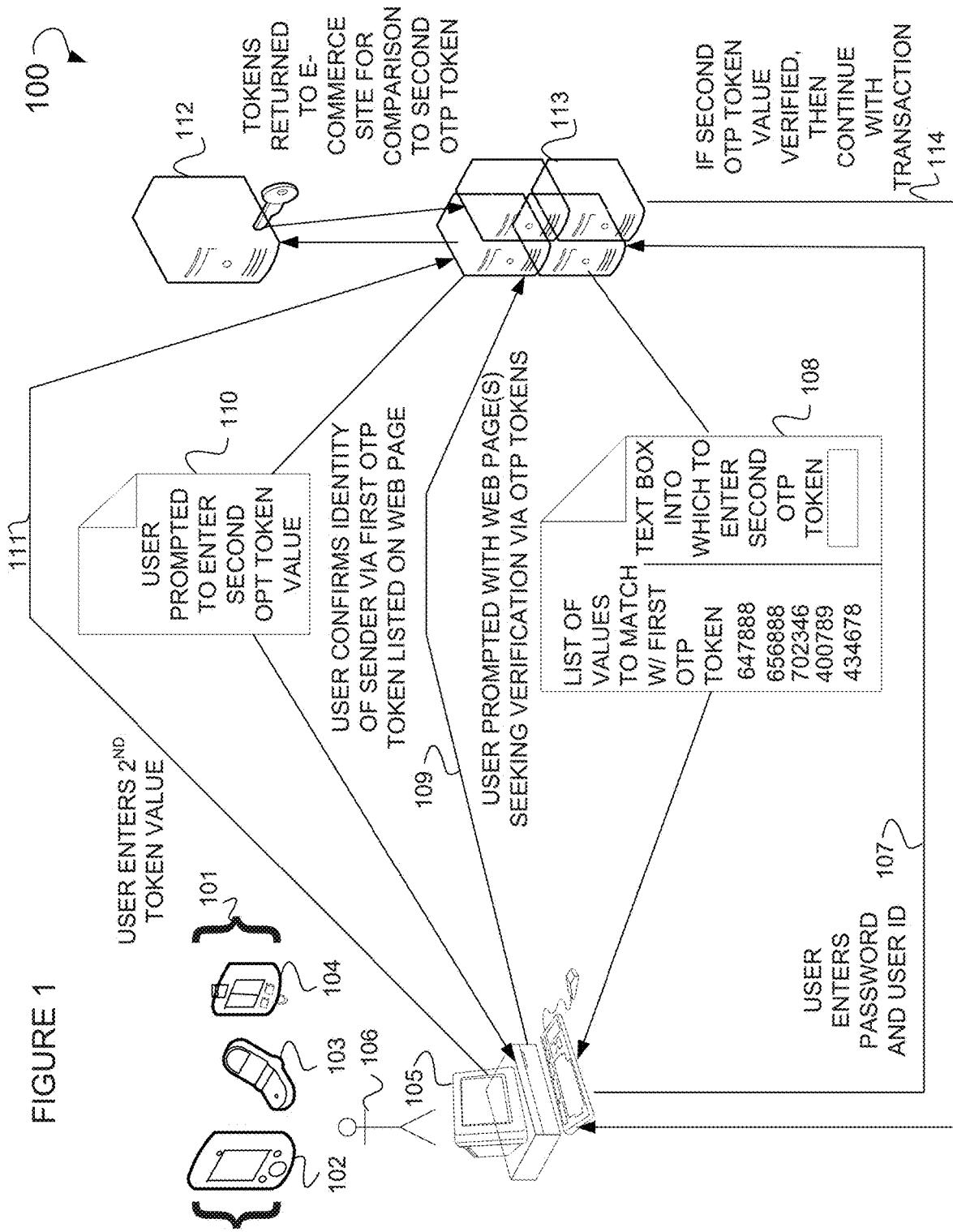
FIG. 1 is a block diagram illustrating an example system for two-factor authentication.

FIG. 1 is a block diagram showing an example system 100. Some example embodiments may include a set 101 containing a variety of devices that can be used to generate two OTP tokens using one clock synchronized with a clock residing on a third-party authentication server. These devices facilitate two-factor-authentication via using a combination of a shared secret in the form of two (2) unique serial numbers used in combination with a clock value synchronized with an authentication web site and servers operating thereon. A double OTP token device may include devices such as a Personal Digital Assistant (PDA) 102, a cell phone 103, or a dual OTP key fob 104. A user 106 using a computer system 105 enters their password and identification information into a web page. This information is sent via a network connection 107 to a site 113. Once the user's password and identification values are verified, a web page 108 is displayed to the user 106 via the computer system 105.

This web page 108 may contain at least two fields. A first field (e.g., prompt 109) contains a series of OTP token values which may be six-digit values, seven-digit values, eight-digit values, or some other suitable size token. These values are actual OTP token values, whereas in other embodiments some of these values are pseudo-OTP token values appearing in combination with authentic OTP token values. A second field (e.g., prompt 110) of this web page 108 contains a text box, drop-down menu, object, or widget where a user 106 can enter or select a token value. A user 106 may review the first field of the web page 108 to determine whether one of the displayed token values corresponds to one of the two values displayed on one of the members of the set 101. Once a user 106 verifies that this value exists in this first field, the user 106 may then look for a second value presented in one of the members of the set 101 to enter into the textbox or other input object, contained in the second field of the web page 108. Once the user 106 enters this second token value, the second token value is sent to the site 113 for verification (see e.g., 111).

The second token value is then compared to token values received from a secured verification site 112 (e.g., the site of the third-party authentication server). This secured verification site 112 uses asymmetric encryption (e.g., Rivest, Shamir and Adleman (RSA) encryption), symmetrical encryption (e.g., Advanced Encryption Standard (AES) encryption), or a hybrid encryption (Hybrid-Crypto) system. Three or more tokens may be returned from the secured verification site 112 to the site 113. If the verification of the second OTP token value is successful, then the user 106 is allowed to proceed with the transaction. (See e.g., 114)

A Three-Tier Architecture

An example embodiment may be a distributed or non-distributed software application designed under a three-tier software architecture paradigm, whereby the various modules of computer code that make up application can be categorized as belonging to one or more of these tiers. The first tier is an interface level that is relatively free of application processing. The second tier is a logic level that performs processing in the form of logical/mathematical manipulations (logical manipulations) of data inputted through the interface level, and communicates the results of these logical manipulations with the interface and/or back-end or storage level. These logical manipulations may relate to certain business rules or tasks that govern the application as a whole. These logical manipulations and associated business rules include rules to facilitate the verification of two or more OTP tokens via one or more web pages (e.g., web page 108). More to the point, the logic level helps to establish a two-factor-authentication system whereby a user (e.g., user 106) is asked to meet the "what you have" or "what you are" factor by providing a valid OTP token value to an authenticating third party (e.g., secured verification site 112) and the "what you know" factor by matching a second OTP token value to those values provided by the third-authenticating party. The storage level is a persistent storage medium or non-persistent storage medium. One or more of these tiers may be collapsed into another, resulting in a two-tier architecture, or one-tier architecture. For example, the interface and logic levels may be consolidated, or the logic and storage level may be consolidated, as in the case of an application with an embedded database. This three-tier architecture may be implemented using one technology, or as is discussed below, a variety of technologies. These technologies may include one or more object-oriented programming languages such as, for example, Java™, C++, Delphi™, C #™, or the like. Additionally, structured programming languages such as, for example, C may also be used. Moreover, scripting languages such as, for example, Perl, Python, PHP, JavaScript or VBScript™ may also be used. This three-tier architecture, and the technologies through which it is implemented, can be implemented in two or more computers organized in a server-client relationship, as is well known in the art, such that an interface level resides on a client computer, whereas a logic level resides on the application server (see below) and the storage level resides on a database server (see below). Moreover, these three tiers can be distributed between two or more computers organized in a peer-to-peer configuration whereby, for example, the storage level is distributed across a plurality of computer systems. Put another way, these three levels may be distributed between the two or more computers.

An Interface Level

A further example embodiment may be implemented using a client-so architecture, and using a client-based application (e.g., a browser application or a programmatic client application). Some well-known client-based browser applications include NETSCAPE™, INTERNET EXPLORER™, MOZILLA FIREFOX™, OPERA™, or some other suitable browser application. Common to these browser applications is the ability to utilize a HyperText Transfer Protocol (HTTP) or Secured Hyper-Text Transfer Protocol (HTTPS) to get, upload (e.g., PUT) or delete web pages and interpret these web pages, which are written in a hyper-text mark-up language (HTML) and/or an Extensible-Mark-up Language (XML). HTTP and HTTPS are well known in the art, as are HTML and XML. HTTP and HTTPS may be used in conjunction with a Transmission Control Protocol/Internet Protocol (TCP/IP) as described in the Open Systems interconnection (OSI) model, or the TCP protocol stack model, both of which are well known in the art. The practical purpose of the client-based browser application is to enable a user to interact with the application through the display of plain text, and/or interactive dynamic functionality in the form of buttons, text boxes, scroll down bars or other objects contained on one or more web pages constructed using the aforementioned HTML and/or XML.

Web pages may be static or dynamic in nature. Those that are static typically display text as one would see it on a printed, physical page. Dynamic web pages, however, are interactive and allow for a user to input data, query data, and/or modify data just to name a few of the functionalities associated with dynamic web pages. The dynamic nature of web pages is a product of the use of the other technologies in combination with HTML and/or XML.

Java Server Page (JSP™), or Active Server Pages (ASP™ or ASP.NET™) (collectively server pages) may be used to provide a user with dynamic web pages or content via their web browser. Additional technology in the form of an additional program (e.g., routine) written in another programming language is embedded into the HTML and/or XML code, allowing for web pages to become dynamic. Some of these additional technologies include, for example, embedded routines written in the JAVA programming language, the JavaScrip™ language, or the VBSCRIPT programming language or some other suitable programming language. These embedded routines are used to execute the aforementioned HTTP, HTTPS requests (e.g., GET, PUT, and DELETE) for web pages. Various types of programming structures such as branches, loops and other types of logic structures are used in such routines. These routines may allow a user to log in and request content to upload or download. For example, a GUI is used and is implemented via a Java Servlet, Applet, or VBScript or C # form, or some other suitable programming language. As is discussed below, web pages containing GUIs are stored at the logic level, but executed at the interface level via a web browser. These server pages contain objects such as text boxes, buttons, scroll-down bars, or some other suitable dynamic interface object. These objects, and the routines governing them, allow a user to retrieve, input, or delete content, just to name few of the functions. For example, a user is prompted with a login page requesting username and password information to be entered into two or more text boxes. Once the data entered into the text boxes is verified, a second, new web page is requested, interpreted and displayed in the browser application. The verification of the login information would take place at the logic level outlined below.

In some embodiments, once login and user ID information is verified, the user may be sent one or more web pages containing OTP token values and/or text boxes or other objects, and widgets into which to input or select OTP token values. For example, a user is prompted with a web page containing one or more fields, including a first field with a list of first OTP token values, and a second field with a text box, or other object, widget into which to enter a second OTP value. Two or more web pages may be used, instead of one web page (e.g., 108), to display and enter OTP token values.

Figure 2:
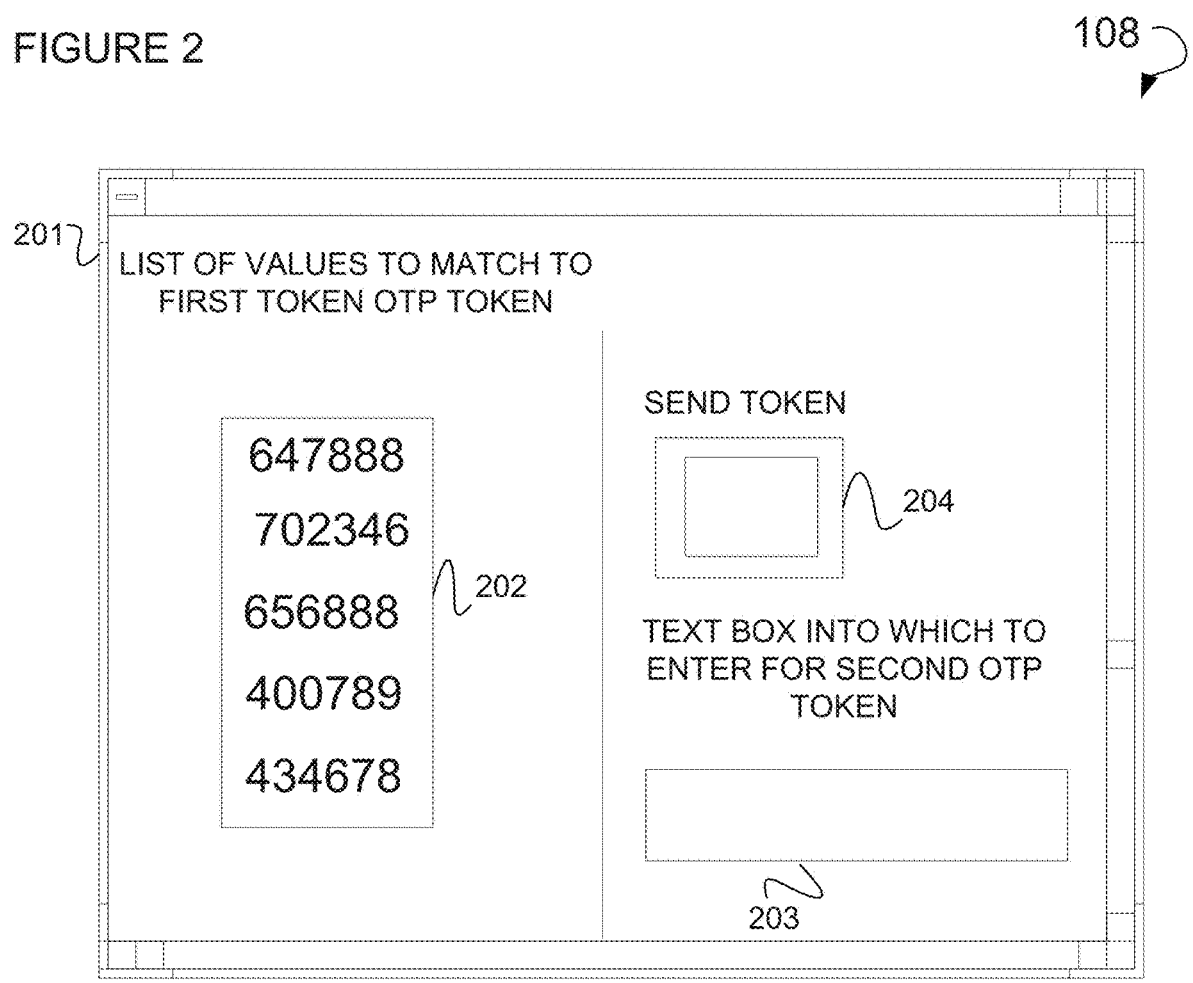
FIG. 2 is an interface diagram illustrating an example GUI in the form of a web page.

FIG. 2 is a user interface diagram illustrating an example GUI 201, in the form of a web page 108. It will be appreciated that the GUI 201 may be generated utilising any one of a number of other technologies, such as Asynchronous JavaScript and XML (AJAX), Adobe FLASH etc. Illustrated is a list 202 of values to match with a first token. These values are themselves OTP token values generated by a secured verification site 112, or, in some embodiments, a site 113 and the servers used to maintain each of these respective sites. A user, such as user 106, may generate their own first OTP token values using, for example, one of the devices 101 and compare a first one of these OTP token values to the values on the list 202. Also illustrated is a text box 203 wherein a user, such as user 106, may input a second OTP token value generated by one of the devices 101. Once entered, a send token button 204 is executed. Collectively the list 202 and text box 203 allow for two factor authentication, for the list 202 allows for a web site (e.g., 113) to prove the "what you have" or "what you are" factor by providing a valid OTP token value to a user (e.g., 106), and the "what you know" factor is proven by the user via inputting an OTP token value into the text box 203 and sending it to the site 113 or 112.

Logic Level

The above described Servlets, Applets, and/or VBScript forms may be stored as a JSP™, or ASP™ on one or more remote server computers connected to the client computer via an Internet. These remote servers can be a web browser and/or application server. Web servers running JSP™ can include the APACHE™/APACHE TOMCAT™ web server. Web servers running ASP™ can include a MICROSOFT WINDOW WEB SERVER 2003™. Application servers running JSP™ can include ORION APPLICATION SERVER™ or other J2EE™ certified application servers. Application servers running ASP™ can include WINDOWS SERVER 2003™.

The logic level may be governed by a scripting language that controls how and when certain web pages or pieces of content are provided to, or made accessible to, a particular user. This scripting language can be in the form of Java, Perl, Python, or some other general purpose scripting language. For example, once the logic of a JSP™ determines that a particular object (e.g., a text box) on a web page has been executed (e.g., a username and password has been entered and sent), the data from this text box is inputted and sent to a web or application server. It is the routine written in a scripting language that determines whether, for example, the username and password are valid. The routine written in a scripting language may serve to retrieve data from a storage, data structure, or data base level. The storage level may be run by a separate database application, while in other embodiments a database embedded with a logic level is implemented.

Figure 3:
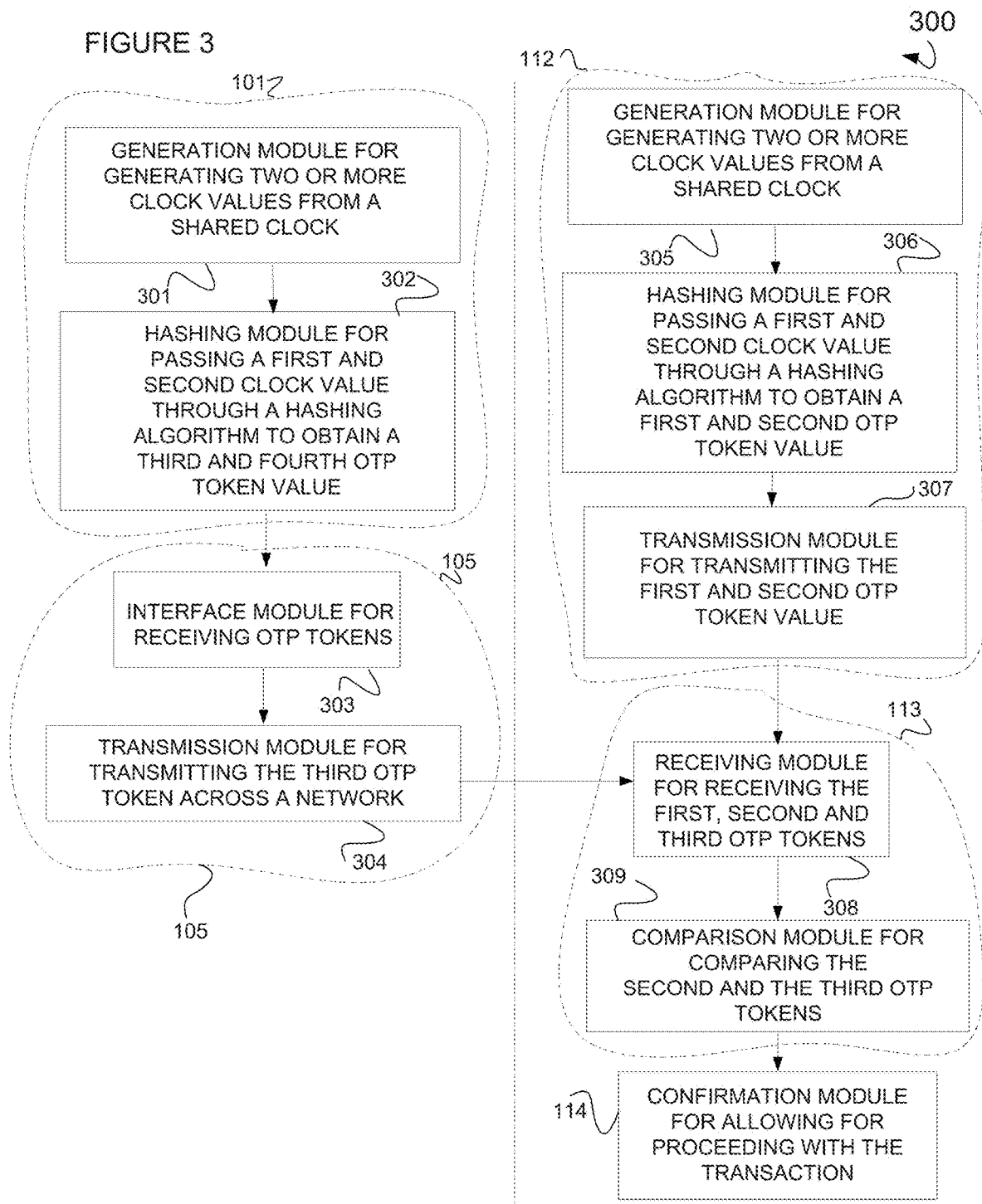
FIG. 3 is a dual stream flowchart illustrating an example method for two-factor authentication.

FIG. 3 is a dual stream flowchart illustrating an example method 300 for two-factor authentication. Illustrated is a module 301 and 302 residing on one or more of the devices 101. The module 301 generates two or more clock values from a shared clock. Once these values are generated, then a passed to the module 302 wherein they are hashed using a hashing function (see below description of hashing function) into two or more OTP token values. One of these OTP token values (e.g., a third OTP token value) is provided to a computer system 105 by, for example, a user 106 inputting the value through some type of port connection (e.g., a Universal Serial Bus (USB)). Module 303 receives third OTP token values via, for example, the USB port. By providing this third OTP token value, one of the two factors of authentication may be met. In some embodiments, this OTP token value is passed to a module 304 that transmits this third OTP token value to a module 308 residing on a site secured verification site 113 and the servers managing this site. Also illustrated are modules 305, 306, and 307 that are a part of secured verification site 112 and the servers that manage this site. Module 305, like module 301, generates two or more clock values that are passed through a module 306 wherein a hashing function is applied to generate OTP token values (e.g., a first and second OTP token value). These OTP token values are then passed to a module 307 for transmission across a network (e.g., an Internet) to a module 308 that receives not only the third OTP token value, but also, the first and second OTP token values. Once these various OTP token values (e.g., the first, second and third OTP token values) are received, they are passed onto a module 309 for comparison, wherein the values of the second and third OTP tokens are compared, and where found to be synchronized, a verification or, in some cases a non-verification signal where non-synchronization occurs, is passed to the module 310. In some embodiments, the module 309 de-hashes (e.g., uses reverse hashing) the OTP token values it receives and once de-hashed the resulting clock values are compared for a determination as to whether the values are synchronized. In some embodiments, it is the site 113 that executes the module 309, whereas in other embodiment it is the secured verification site 112 that executed this module 309.

Storage Level

A storage level may be implemented whereby tables of data are created, and data is inserted into, and selected from, these tables using a structured query language (SQL) or some other database-related language known in the art. These tables of data can be managed using a database application such as, for example, MYSQL™, SQLSERVER™, Oracle 9I™ or 10G™, or some other suitable database application. These tables are organized into a Relational-Database Schema (RDS) or Object-Relational-Database Schemas (ORDS), as is known in the art. These schemas can be normalized using certain normalization algorithms so as to avoid abnormalities such as non-additive joins and other problems. These normalization algorithms include Boyce-Codd Normal form or some other normalization, optimization algorithm known in the art. For example, some embodiments may include username and associated password information being stored together such that the scripting routine can compare the inputted, received username and password information to that data stored in the database. The secured verification site 112 may have a number of tables containing one or more serial numbers for a particular double OTP token device and the associated clock value, and clock cycle setting for a particular device. These tables may be able track whether a particular device has been activated. This tracking is based upon the unique serial number or numbers of the particular device.

Distributed Computing Modules

In some embodiments, remote procedure calls are used to implement one or more of the above described levels of the three-tier architecture across a distributed programming environment. For example, a logic level resides on a first computer system that is remotely located from a second computer system containing an interface or storage level. These first and second computer systems can be configured in a server-client, peer-to-peer or some other suitable configuration. These various levels can be written using the above described component design principles, and can be written in the same programming language, or a different programming language. Various protocols may be implemented to enable these various levels, and components contained therein, to communicate regardless of the programming language used to write these components. For example, a module written in C++ using COBRA or SOAP can communicate with another remote module written in Java™. These protocols include Simple Object Access Protocol (SOAP), and the Common Object Request Broker Architecture (CORBA) or some other suitable protocol. These protocols are well-known in the art.

A System of Transmission Between a Server and Client

Example embodiments may use the OSI or TCP/IP protocol stack models for defining a network across which to pass data. Applying these models, a system of data transmission between a server and client computer system can be described as a series of roughly five layers comprising a: physical layer, data link layer, network layer, transport layer and application layer. The various levels (e.g., the interface, logic and storage levels) reside on the application layer of the TCP/IP protocol stack. The present application may utilize HTTP to transmit content between the server and client applications, whereas in other embodiments another protocol known in the art is utilized. Content from an application residing at the application layer is loaded into the data load field of a TCP segment residing at the transport layer. This TCP segment also contains port information for a recipient application residing remotely. This TCP segment may be loaded into the data field of an IP or User Datagram Protocol (UDP) datagram residing at the network layer. Next, this IP datagram is loaded into a frame residing at the data link layer. This frame is then encoded at the physical layer and the content transmitted over a network such as an Internet, LAN or WAN. Internet refers to a network of networks. Such networks may use a variety of protocols for exchange of information, such as TCP/IP, Asynchronous Transfer Mode (ATM), etc., and may be used within a variety of topologies or structures. This network may include a Carrier Sensing Multiple Access Network (CSMA) such an Ethernet based network.

Double OTP Token Device: Dual OTP Key Fob

FIG. 4 shows perspective, side and front views of an example dual OTP key fob 400. In some embodiments, a screen 401 displays a first OTP token. A second screen 402 displays a second OTP token. A button 403 may allow an OTP token value to be displayed to a screen 401. A button 404 may allow a second OTP token value to be displayed to a screen 402. Some embodiments may include the color coding of the buttons 403 and 404 to denote a first button and a second button. For example, button 403 may be black, while button 404 could be white. A key ring 405 allows the dual OTP key fob 400 to be operatively coupled to a key chain or other convenient means of carrying the fob. Some embodiments may include a USB plug 406. Illustrated in FIG. 4 is a side view showing button 403, key ring 405, and USB plug 406. Also illustrated is a top-down view showing screens 401, 402, buttons 403, 404, key ring 405, and USB plug 406. Dual OTP key fob 104 is an example of dual OTP key fob 400.

Figure 5:
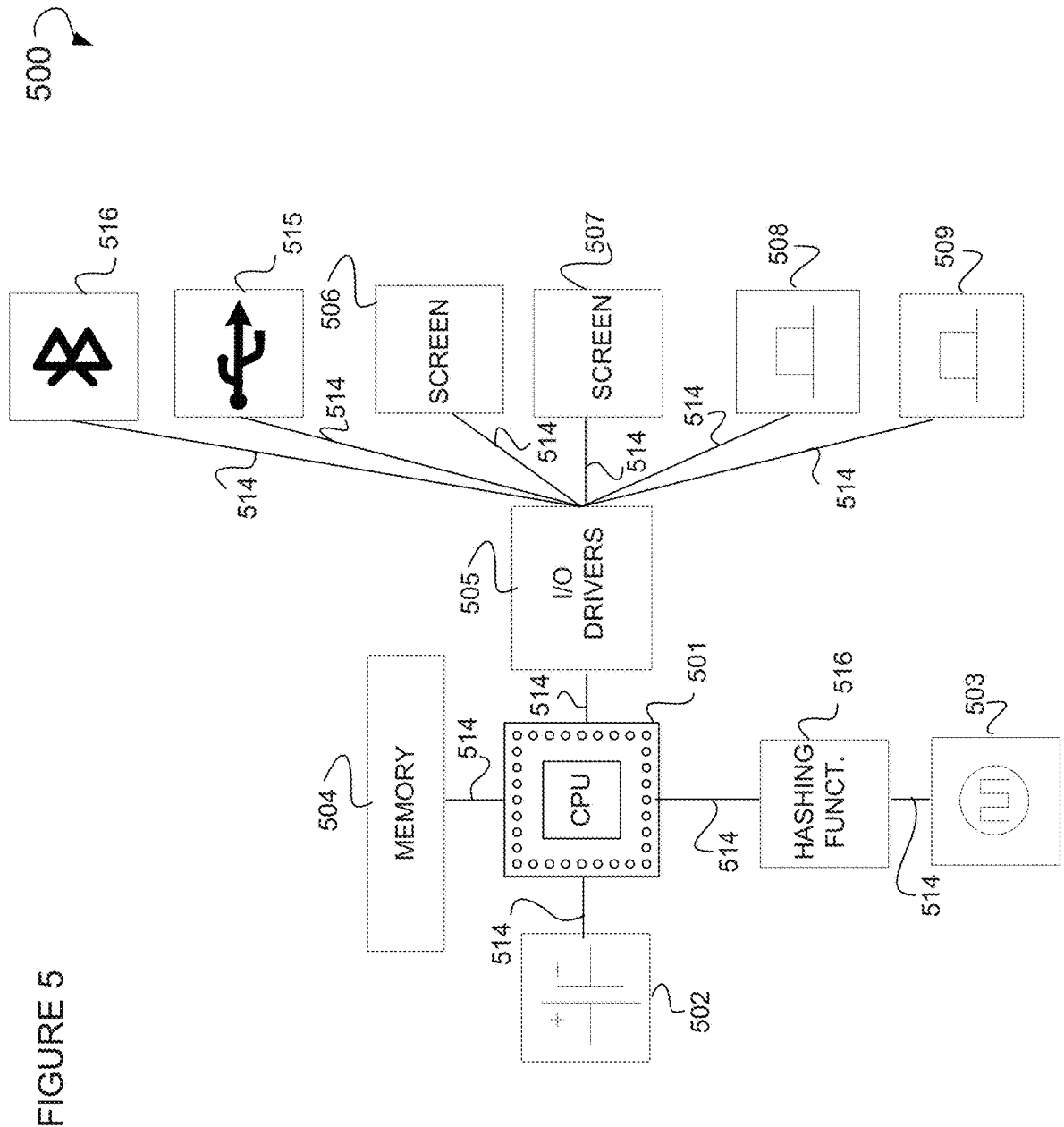
FIG. 5 is a schematic of various example hardware and software components that may be used to create a dual OTP key fob.

FIG. 5 is an example schematic 500 of various hardware and software components that can be used to create a dual OTP key fob 400. These various components can all be hardware, whereas, in other embodiments, these components can all be software, firmware, or these components can be a combination of the aforementioned. A CPU 501 may be used to perform various mathematical operations. Contained within the CPU 501, for example, are various adders and multipliers, or only adders, or only multipliers. CPU 501 is able to process a 20 bit, 21 bit or some other suitable size word. The CPU 501 is operatively coupled to a battery 502. A battery 502 may be a rechargeable battery, whereas, in other embodiments, it may be a disposable battery. The CPU 501 and battery 502 are connected via a bus 514. The CPU 501 is operatively coupled via a bus 514 to a piece of memory 504. The memory 504 is used to store values derived from a clock 503, whereas in other embodiments this memory is used to store OTP token values. These values can be one or more sequential clock values (e.g., integers) or serial clock values, or these values can be serial clock values or sequential clock values that have been hashed via a hashing function 516 that is also operatively coupled to both the CPU 501 and the clock 503. This memory 504 can also contain various input/output drivers 505 and/or the aforementioned hashing function 516. This memory 504 can be of some suitable size including, for example, a 64 kilobyte or megabyte memory, a 128 kilobyte or megabyte memory, or a 256 kilobyte or megabyte memory, or some other suitable memory size. This memory size may be contingent upon whether additional memory is needed to use the device to store data (e.g., data files, media files), in addition to, OTP token values. Various input/output drivers 505 are operatively coupled via a bus 514 to a CPU 501. These input/output drivers 505 are then operatively coupled to various input/output devices via various buses 514. An optional USB plug 515 is connected to the input/output drivers 505, The USB plug 515 may provide power to recharge the battery 502. Additionally, through this USB plug 515, clock synchronization takes place between a clock 503 as a part of the device and a clock located remotely as a part of, for example, an authentication server. Other types of data transfer and synchronization can take place via the USB plug 515. In lieu of, or in addition to, the USB plug 515, a BLUE TOOTH™ transmitter/receiver 517 may be implemented to allow for the wireless transfer of data between a dual OTP key fob 400, and, for example, an secured verification site 112. In cases where the BLUE TOOTH™ transmitter/receiver 517 is implemented, the transfer of data (e.g., clock data) is facilitated through the use of a computer system 105 that receives data from the dual OTP key fob via the the BLUE TOOTH™ transmitter and receiver 517, and then transmits this data via a network interface device operatively coupled to the computer system 105 (see below description of the computer system). A first screen 506 may be operatively coupled to the input/output drivers 505. A second screen 507 is operatively coupled to the input/output drivers 505 via a bus 514. In some embodiments, only one screen (e.g., 506 or 507), is operatively coupled to the input/output drivers 505 (not illustrated). Example embodiments may further include the screen 506 and/or 507 as having liquid crystal displays, whereas in other embodiments they are another type of suitable display including, but not limited to, a color screen, a monochrome screen or some other suitable screen. The buttons 508 and 509 (e.g., a biased switches) may be operatively to the input/output drivers 505 via a bus 514. Both buttons 508 and 509 may be used in the dual OTP key fob 500, whereas in other embodiments only one button (e.g., 508 or 509) is used in the device. A hashing function 516 may be implemented. This hashing function 516 is used to hash various integer or other type of numeric values derived from the clock 503 to which it is operatively coupled via, for example, a bus 514. Once these values derived from clock 503 are hashed via the hashing function 516. The hashing function 516 may implement an operation 405.

Some embodiments may include a memory 504 that may be Electrically Erasable Programmable Read-Only Memory (EEPROM), Random-Access Memory (RAM), Flash memory or some other suitable memory type. Some embodiments may include EEPROM where the dual OTP key fob 500 is completely powered down, whereas if the dual OTP key fob 500 is going to continue to use memory (e.g., to power the clock 503), RAM may be preferable. Moreover, if the device is going to be used for things (e.g., storing data), in addition to the generation and storage of tokens, then Flash memory may be preferable.

In some embodiments, the battery 502 may be a Lithium-ion battery, Lithium-ion polymer battery, Nickel-cadmium battery, Nickel metal hydride battery, or some other suitable rechargeable battery. Further, the battery 502 may be an alkaline battery, Lithium battery, Silver-oxide battery, or some other suitable battery type. Moreover, the battery 502 may be a 1.5 volt, 1.55 volt, 3 volt or some other battery of a suitable voltage.

In some example embodiments, the clock 503 may be an application written in software and saved into the memory 504, whereas, in other embodiments, it may be completely implemented using hardware. The values generated by the clock 503 are integer values. Where the clock 503 is implemented in hardware, an additional software module may be needed to allow for the re-synchronization of the clock with another clock contained on, for example, an authentication server such as the secured verification site 112. Re-synchronization may take the form of the software module, compensating for the difference between the clock signal and the clock value as reflected in the secured verification site 112. In providing this compensation, the problem of token drift can be addressed.

In some example embodiments, a BLUE TOOTH™-based transmitter/receiver 517 is operatively coupled to the I/O driver 505. This transmitter/receiver 517 is a BLUE TOOTH™ transmitter and implements the Institute of Electrical and Electronics Engineers (IEEE) standard 802.15.1 or some other suitable protocol. Data including, for example, a clock current time request is transmitted from the transmitter/receiver 517 to a BLUE TOOTH™ USB adapter operatively coupled to a USB port residing on a computer system 105. In some embodiments, BLUE TOOTH™ 1.0, 1.0B, 1.1, 1.2, or 2.0 is implemented as a part of the I/O driver 505. A unique 48-bit address may be associated with the dual OTP token device allowing the device to be unique or distinguishable from other devices using the BLUE TOOTH™ protocol. This 48-bit address that makes up the dual OTP token device unique contains the serial number (e.g., 112346) associated with the dual OTP token device. Put another way, the 48-bit address is unique by virtue of the use of the serial number for the dual OTP token device being used in combination with other values.

FIG. 6 is a network diagram 600 describing the initiation of a TCP/IP connection by a dual OTP token device 104 with a secured verification site 112. In some embodiments, a dual OTP token device 104 with a USB connector 515 is inserted into the USB port of a computer system 105. Once inserted, a TCP/IP Connection 602 maybe initiated via HTTPS, or HTTP. Additionally, in some embodiments, a dual OTP device 104 with a BLUE TOOTH™ transmitter/receiver 517 is used to transmit data to and receive data from a computer system 105 through the TCP/IP connection 602. This TCP/IP connection is initiated with the secured verification site 112 over a network 601. In some embodiments, in lieu of a TCP/IP connection being initiated, a UDP/IP connection is initiated by the dual OTP token device 104.

FIG. 7 is a network diagram 700 describing the updating of a clock time on a dual OTP token device 104. In some example embodiments, a dual OTP token device 104 with a USB connector 615 is inserted into a computer system 105. Once a TCP/IP connection is initiated via datagram 602, a TCP/IP datagram 701 containing a request for the current time is sent over a network 601 to a secured verification site 112. This request for a current time is denoted by packet 701 as described herein. Once the datagram 701 is sent, a second TCP/IP datagram referenced herein as 702 is sent by the secured verification site 112 across a network 701 to the computer system 105 and ultimately to the dual OTP token device 104, where the clock time on the dual OTP token device 104 is updated with the current time contained in the TCP/IP datagram 702.

FIG. 8 is a flow chart illustrating a method 800 applied in the updating of a clock time on a dual OTP token device 104. In some embodiments, a user 106 inserts the dual OTP token device 104, which contains an accompanying USB connector 615, into a computer system 105. Once inserted, a module 801 is automatically initiated, wherein the module 801 initiates a TCP/IP connection. The initiation of a TCP/IP connection is well known in the art. Once the TCP/IP connection is established via the module 801, a second module 802 requests the current time from a secured verification site 112. This request for current time is sent via a TCP/IP datagram. In some embodiments, once the secured verification site 112 receives the request for current time it transmits the current time via a second TCP/IP datagram to the computer system 105 and, ultimately, the dual OTP token device 104. In some embodiments, the dual OTP token device 104 receives the current time via a module 803 and then, in turn, implements or executes a module 804 to update the clock residing on the OTP dual token device 104. In some embodiments, this clock is the clock 503 referenced above.

FIG. 9 is a flowchart illustrating the various sub-modules that make up a method 900 underlying the above referenced module 802. In some embodiments, a module 901 sends a current time request via a TCP/IP datagram to a specific port or socket located on the secured verification site 112. A module 902 residing on the secured verification site 112 receives the request for the current time. Once this request is received, a third module 903 is executed that transmits the current time to a port or socket located on the computer system 105. This transmission is across a network 701, such as an internet, and is transmitted via a TCP/IP datagram. Once this TCP/IP datagram containing the current time is received, the clock 503 is updated.

Example Use Case

Figure 10:
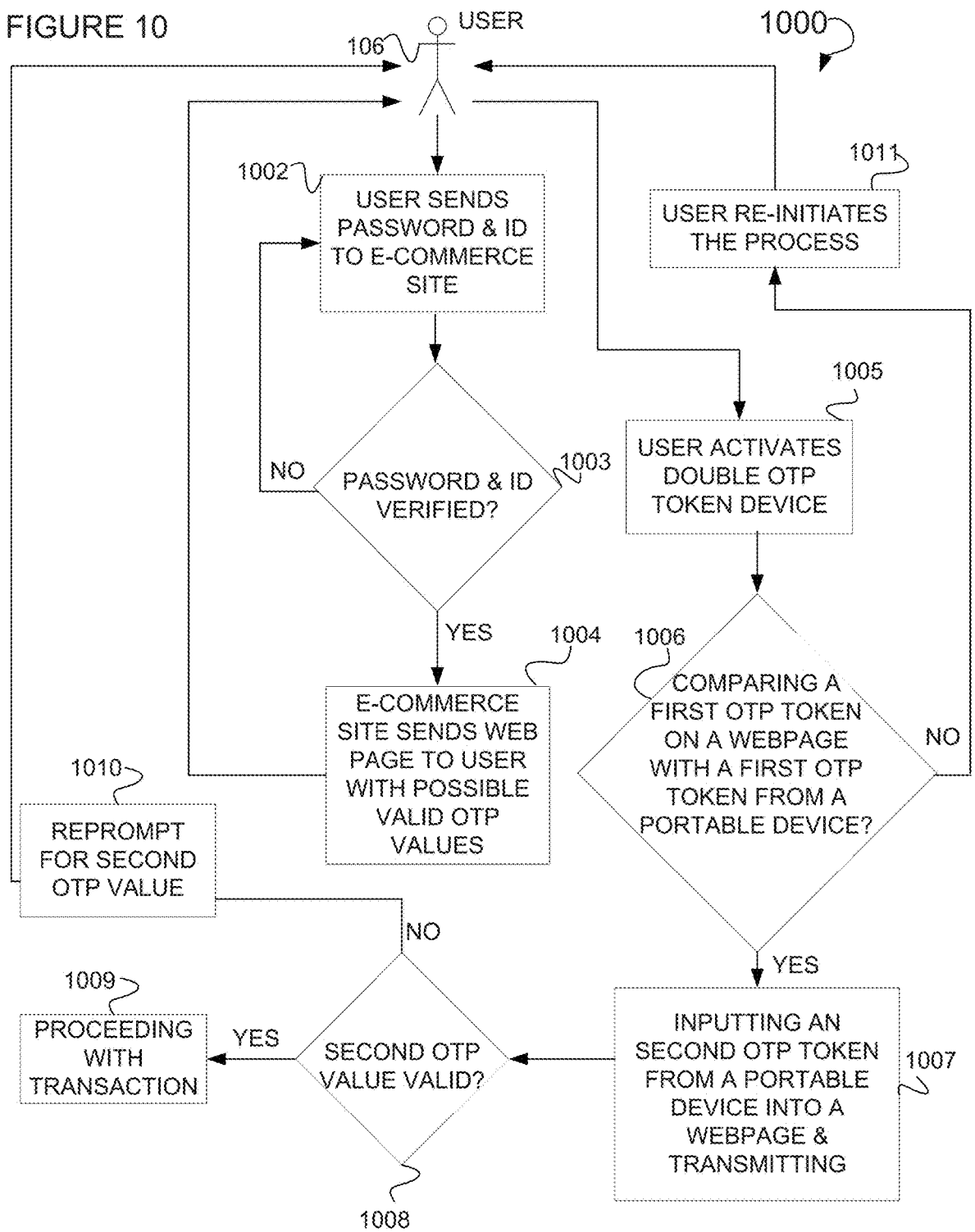
FIG. 10 is a flowchart illustrating second example method for two-factor-authentication illustrated.

FIG. 10 is a flowchart illustrating a second example method 1000 for two-factor-authentication. In some embodiments, a user 106 uses an operation 1002 to send password and ID information to an site via, for example, a web page 108. This password and ID information is verified via a verifier 1003 such as a site 113. If the password or the ID is unverified, then the user is re-prompted to enter correct password and ID information. If the password and ID are correct, then at operation 1004 the site 113 prompts the user with a web page 108 that allows the user to both review OTP token values, and enter OTP token values into the web page. To obtain OTP token values the user uses an operation 1005 wherein the user activates a double OTP token device (e.g., cell phone 103, PDA 102, or dual OTP key fob 104).

The user may then decide if the first token displayed on the double OTP token device is displayed on the web page 108 provided by operation 1004. If the value is not displayed on the web page 108, the user 106 may reinitiate the operation 1005 via an operation 1011 to obtain additional tokens using the double OTP token device.

The user 1001 may then determine that the site 113 has not been authenticated (e.g., according to the two-factor-authentication system, they have failed to prove the first factor: "what you (they) are"), and may cease the attempt to authenticate. If the value is on the web page 108, then the user is forwarded to operation 1007.

A decisional operation value 1006 is used to allow the user to determine whether or not the value is contained on the web page 108 or not. Operation 1007 allows the site 113 to send or forward a web page 108 to a user 106 to prompt the user 106 to enter in a second OTP token value taken from the double OTP token device. In terms of the two-factor-authentication system, this may allow the user to prove "what you (they) know." A decisional operation 1008 allows the user to either proceed with the transaction (e.g., the buying or selling of goods or services), via an operation 1009 if a valid second OTP token value exists and is entered into the web page 108 displayed via an operation 1004, or the user may be re-prompted via an operation 1010 to enter in a valid second OTP value.

An operation 1007 illustrates an encryption engine. In some embodiments, this encryption engine is displayed in FIG. 7 as an encryption engine 721. This encryption engine is responsible for encrypting and decrypting data including OTP token values sent between the site 113 and the computer system 105 and resides, for example, on the computer system 105. The encryption engine may implement a symmetric key algorithm, whereas, in other embodiments, it may implement an asymmetric key algorithm (e.g., un-tethered and tethered systems of encryption). The symmetric algorithm may implement the Advanced Encryption Standard (AES), or some other suitable encryption algorithm (e.g., DES, Triple-DES, IDEA, or Blowfish just to name a few). AES may use key sizes of, for example, 128, 192, or 256 bits. Some embodiments may include a tethered or asymmetric system that utilizes a public and private key (e.g., a key pair) to encrypt and decrypt an OTP token. Some well known asymmetric encryption algorithms include RSA, and Diffie-Hellman, just to name a few. The usefulness of a particular key size (symmetric or asymmetric) can be determined through empirical testing and/or modeling. The key size may be automatically determined by the encryption engine based upon some type of preset size. In still other embodiments, the key size is selected by the user to meet their particular needs.

In some example systems, a hybrid of symmetric and asymmetric encryption is employed, a system known as a hybrid-crypto system is employed via the operation 1007. Under this system, one or more OTP token values may be encrypted using a symmetric key algorithm which, in turn, is then encrypted using an asymmetric key algorithm. Applying the hybrid-crypto system, a site 113 receives a one or more encrypted OTP token values. These token values are de-crypted with a public key held by the site. Once de-crypted, the remaining symmetric encryption is de-crypted with a symmetric key held by the site 113. Alternatively, a public key of a symmetric key algorithm may be used as a signature to verify the identity of the requester of the OTP token value.

Figure 11:
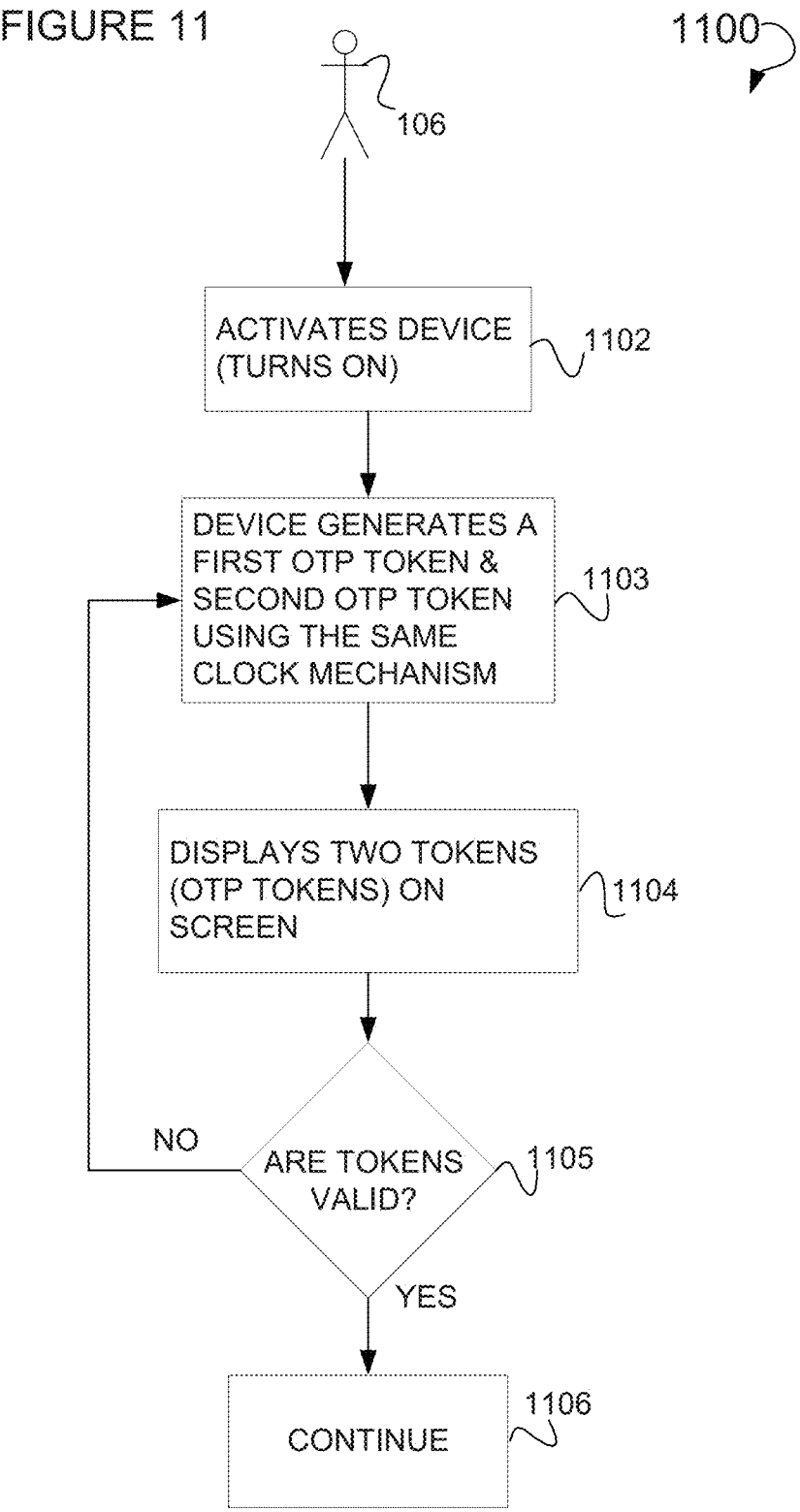
FIG. 11 is a flowchart illustrating an example method for generating two OTP tokens using a device.

FIG. 11 is a flowchart illustrating an example method 1100 for generating two OTP tokens using a device. A user 106 may activate a device in the form of a double OTP token device (e.g., cell phone 103, PDA 102, or dual OTP key fob 104) via an operation 1102. An operation 1103, residing on one of these devices, is implemented wherein the device generates a first token value and a second token value using the same clock mechanism. An operation 1104, again residing on one of these dual OTP token devices, displays two OTP token values on one or more screens. Then a decisional operation 1105 may prompt the user to determine whether the tokens are valid. As discussed elsewhere, the validity of the token may be based upon whether a first OTP token appears on a web page 108, and whether a second OTP token is verified by, for example, an site 113 via a third-party authentication site (see e.g., secured verification site 112). The site 113 would itself perform the verification, in lieu of the third-party secured verification site 112. If the OTP tokens are not valid, then the user is re-prompted with operation 1103 to generate two additional new OTP token values. If the tokens are valid, then the user is allowed to continue with the operation 1106.

Figure 12:
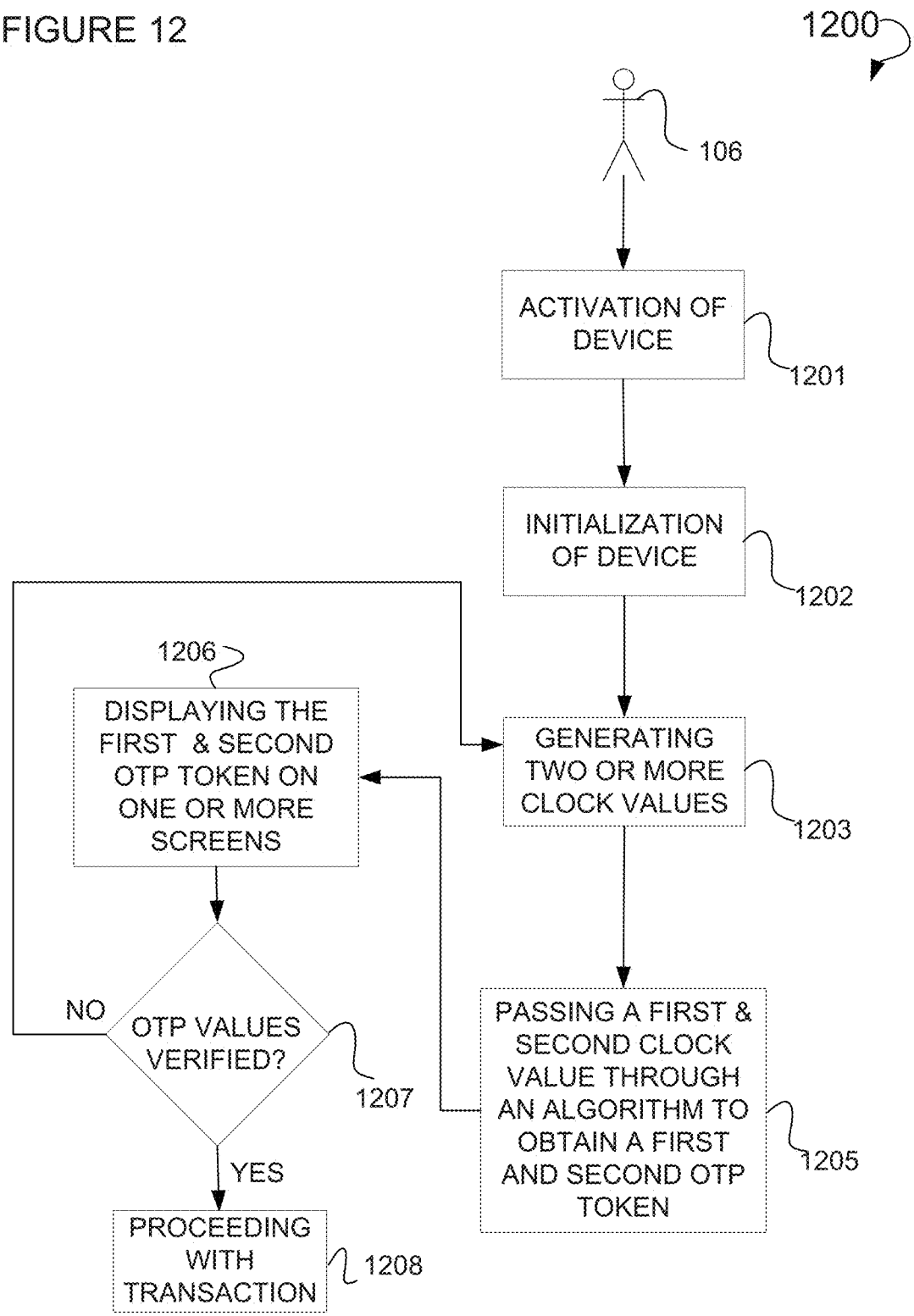
FIG. 12 is a flowchart illustrating an example method for generating two OTP tokens using a token generation algorithm.

FIG. 12 is a flowchart illustrating an example method 1200 to generate two OTP tokens using a token generation algorithm. The logic depicted into this flow chart 1200 may be implemented in, for example, a PDA 102, cell phone 103, or dual OTP key fob 104. An operation 1201 allows the user 1204 to activate the device. Some embodiments may include activation by way of a simple on/off button, touch screen, or a dedicated button to generate the two OTP token values. Once the device is switched on, an operation 1202 allows for the initialization of the memory in the device itself.

After the initialization operation 1202, an operation 1203 may be executed to facilitate the generation of two or more clock values from a single clock. These two or more of these clock values are passed through an operation 1205 wherein an algorithm is used to convert these clock values into OTP token values. Then, an operation 1206 displays the first and second OTP token value on one or more screens. Next, a decisional operation 1207 may be executed wherein the user, or some automated module, determines whether the OTP token values are valid. If they are not valid, then the operation 1203 is re-executed. In the alternative, an operation 1208 may be executed wherein the transaction of good or services can be proceeded with once the OTP token values are successfully verified.

In some embodiments, an operation 1203 obtains a single clock value or a list of clock values. In one embodiment, this clock value can be as simple as a numeric value (e.g., an integer value), or as complex as a series of numeric values reflecting, for example, a date and time. Some embodiments may include a list containing these clock values that reflects the values over a specific range of time, clock ticks, or time increments. This single clock value or list of clock values may be rounded up the nearest cycle value (e.g., a whole integer value). For example, an OTP token value maybe 29.975, but the cycle value is set to increments of 30 (e.g., 30, 60, 90, 24530, and 55660). In such an example, a single clock value, or a list of clock values, is generated and rounded up to, for example, 30 or 24530. Some embodiments may include the single clock values being obtained, or synchronized with, a network connection as in the case of a PDA 103 or cell phone 104 operatively coupled to a network, wherein the PDA 103 or cell phone 104 receives single clock values from the network, or these devices receive a present time value that is then used to generate single clock values.

In some embodiments, the list of clock values obtained from operation 1203 is passed through an algorithm denoted by operation 1205 residing on, for example, one of the aforementioned dual OTP token devices 102, 103, or 104. The algorithm is applied via the operation 1205 to two or more clock values so as to hash, encrypt or otherwise modify the clock values to obscure their identity. In one embodiment, a time value is generated by the clock and is combined with a serial number value unique to the dual OTP taken device. The time value and serial number (e.g., a shared secret value) values are combined with a logical or Boolean operator such as "AND", "XOR", or some other suitable operator. Once combined, the resulting value is passed through a hashing or encryption algorithm contained in a function that resides in operation 1205. This operation can be described as follows using an example clock value of 745, and a serial number of 112346:

745v̄112346=745;
hashing_func(745)=242452 as a token value
The serial number (e.g., 112346) can be divided up into two or more sub values (e.g., 112 and 46), where each sub value is used as a serial number in the above described operation to generate an OTP token value. Some well known hashing algorithms include the Secure Hash Algorithm 1 (SHA-1), and the Message-Digest 5 (MD5) algorithm, just to name a few. Some well know encryption algorithms include the Advanced Encryption Standard (AES), and the Data Encryption Standard (DES). Once obscured, these values are saved into a memory.

In some embodiments, some type of encryption algorithm is used to obscure the clock values. In such an embodiment, a clock value is passed to an encryption algorithm that encrypts using, for example, symmetric encryption to obscure the clock value. This algorithm may be the previously referenced AES or DES. The encryption key used to encrypt may, in some cases, be the same for one of the devices of set 101, and a third-party secured verification site 112. Such a key value may be established at compile time.

In some embodiments, the operation 1205 generates token values based upon a set time interval or cycle. As described herein, this time interval can be set by the site or by the third-party authentication server (see e.g., the secured verification site 112). The OTP token value that is generated may be discrete and unrelated to pre-existing token values (e.g., it is a time-synchronized one-time password), whereas, in other embodiments, this token is based upon previously used or generated token values (e.g., a mathematical-algorithm-based one-time password or event based token).

In some embodiments, a two-factor-authentication system may use two or more sequentially generated tokens that correspond to two or more cycles. For example, in one embodiment, a user is prompted with a web page (see e.g., web page 108) containing an OTP token value that the user needs to verify. Verification occurs, in one embodiment, through the user obtaining a single OTP token value from a dual OTP token device that generates a single token (see above described operation for generating a first token). The user then compares this first token to the values appearing on the web page 108. After waiting one or more cycles, the user obtains a second OTP token value from a device that generates a single token and inputs this second OTP token value into the same (e.g., 108) or a different web page via a text box; drop down menu or other suitable object or widget appearing on a web page. Once this second OTP token value is verified the user is free to transact commerce on the site 113.

Platform Architecture

Figure 13:
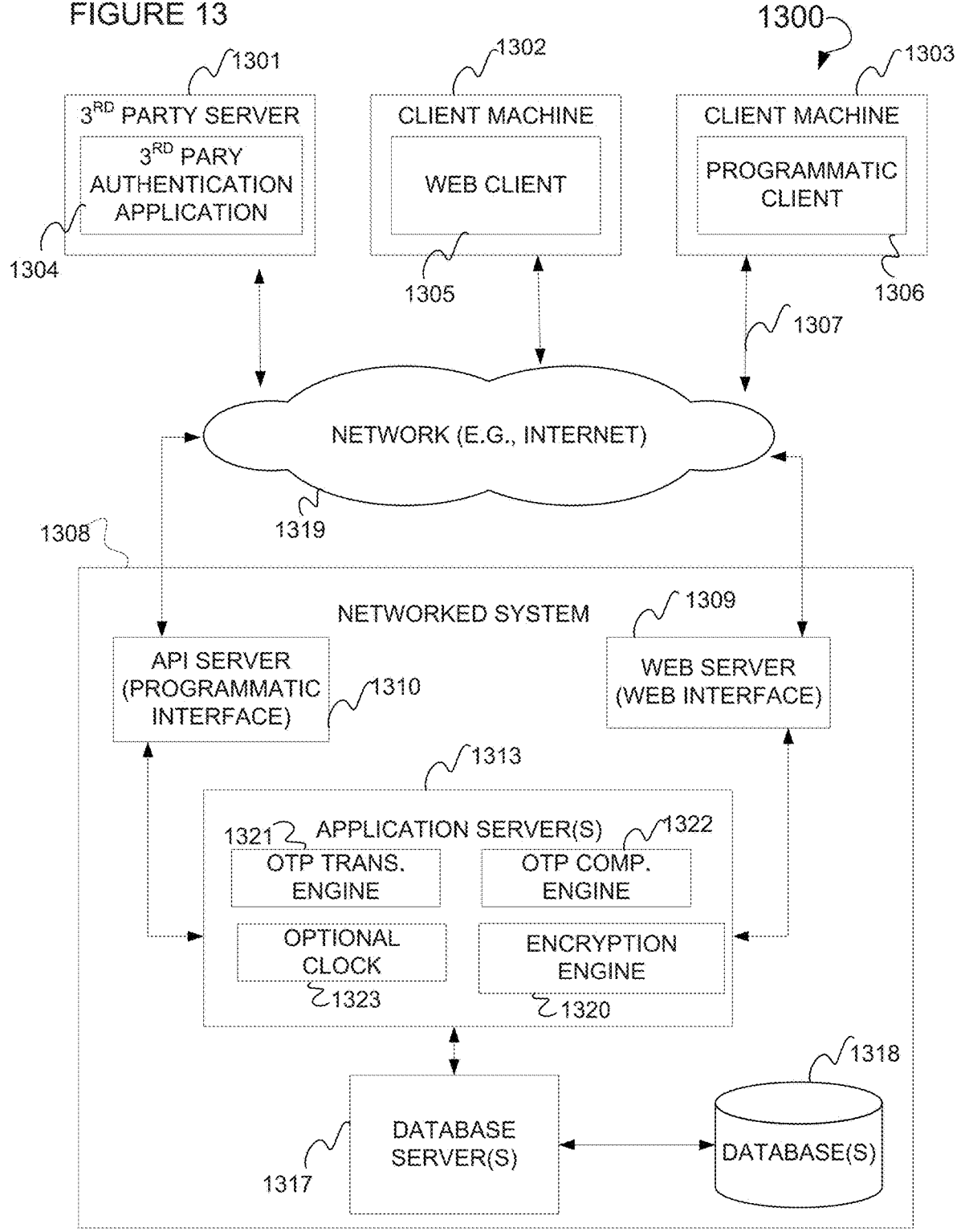
FIG. 13 is a schematic diagram illustrating an example platform architecture.

FIG. 13 is an example platform architecture 1300 diagram. A third-party server 1301 contains various third-party authentication software modules 1304 that are operatively coupled to a network 1319. Secured verification site 112 may contain software 1304. This software 1304 may, for example, implement a symmetric, asymmetric, or a hybrid-crypto system. Some example embodiments may include a client machine 1302 with a web client 1305 that is also connected to a network 1319. This web client may, for example, assist in the execution of operation 604 and the display of a web page 108 to be used to verify OTP token values. Example embodiments may also include a client machine 1303 with a programmatic client application 1306 that is operatively connected to an network 1319 via a local area network (LAN), wide area network (WAN), Internet or other type of network connection, collectively referred to herein as 1307. This programmatic client application 1306 may, for example, allow for the two or more OTP token values generated by a double OTP token device (see e.g., 102, 103 and 104) to be verified automatically via a USB, or other connection to, for example, a networked system 1308. The client machines 1302 and 1303 may be computer systems 105. The network 1319 is connected to a networked system 1308. Example software and/or interfaces residing on this networked system 1308 include an API server 1310, a web server or web interface 1309, an application server 1313 that contains various applications including, for example, an OTP Transmission Engine 1321 (e.g., to execute operation 604), an OTP Comparison Engine 1322 (e.g., to execute decisional operation 608), an optional clock 1323 and an Encryption Engine 1320 (e.g., to execute part of operation 607). Some embodiments may include the optional clock 1323 to perform many of the same functions as the secured verification site 112 described above, in effectively collapsing the functionality of the secured authentication site 112 into the functionality of the application server 1313. A database server 1317 is operatively coupled to one or more databases 1318, and contains information relating to the above described storage level.

In some embodiments, the present invention is implemented on a digital processing system or computer system that includes a processor, which may represent one or more processors and may include one or more conventional types of such processors (e.g., x86, x86-64), such as an AMD processor, Intel Pentium processor or other suitable processor. A memory is coupled to the processor by a bus. The memory may be a dynamic random access memory (DRAM) and/or may include static RAM (SRAM). The processor may also be coupled to other types of storage areas/memories (e.g., cache, Flash memory, disk, etc.), which could be considered as part of the memory or separate from the memory.

In some embodiments, a bus further couples the processor to a display controller, a mass memory or some type of computer-readable medium device, a modem or network interface card or adaptor, and an input/output (I/O) controller. The display controller may control, in a conventional manner, a display, which may represent a cathode ray tube (CRT) display, a liquid crystal display (LCD), a plasma display, or other type of suitable display device. Computer-readable medium may include a mass memory magnetic, optical, magneto-optical, tape, and/or other type of machine-readable medium/device for storing information. For example, the computer-readable medium may represent a hard disk, a read-only or writeable optical CD, etc. A network adaptor card such as a modem or network interface card is used to exchange data across a network such as an Internet. The I/O controller controls I/O device(s), which may include one or more keyboards, mouse/trackball or other pointing devices, magnetic and/or optical disk drives, printers, scanners, digital cameras, microphones, etc.

The present invention may be implemented entirely in executable computer program instructions which are stored on a computer-readable medium or may be implemented in a combination of software and hardware, or in certain embodiments, entirely in hardware.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage medium such as RAM, ROM, Erasable Programmable Read-Only Memory (EPROM), CD-ROM or other optical-disk storage, magnetic-disk storage or other magnetic-storage devices, or any other medium which can be used to carry or store desired program code means in the form of computer-executable instructions, computer-readable instructions, or data structures and which may be accessed by a general-purpose or special-purpose computer system. This physical storage medium may be fixed to the computer system as in the case of a magnetic drive or removable as in the case of an EEPROM device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this illustration and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or PDA) where internal modules (e.g., a processor and memory) work together to perform operations on electronic data.

In some embodiments, the invention may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The invention can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

Figure 14:
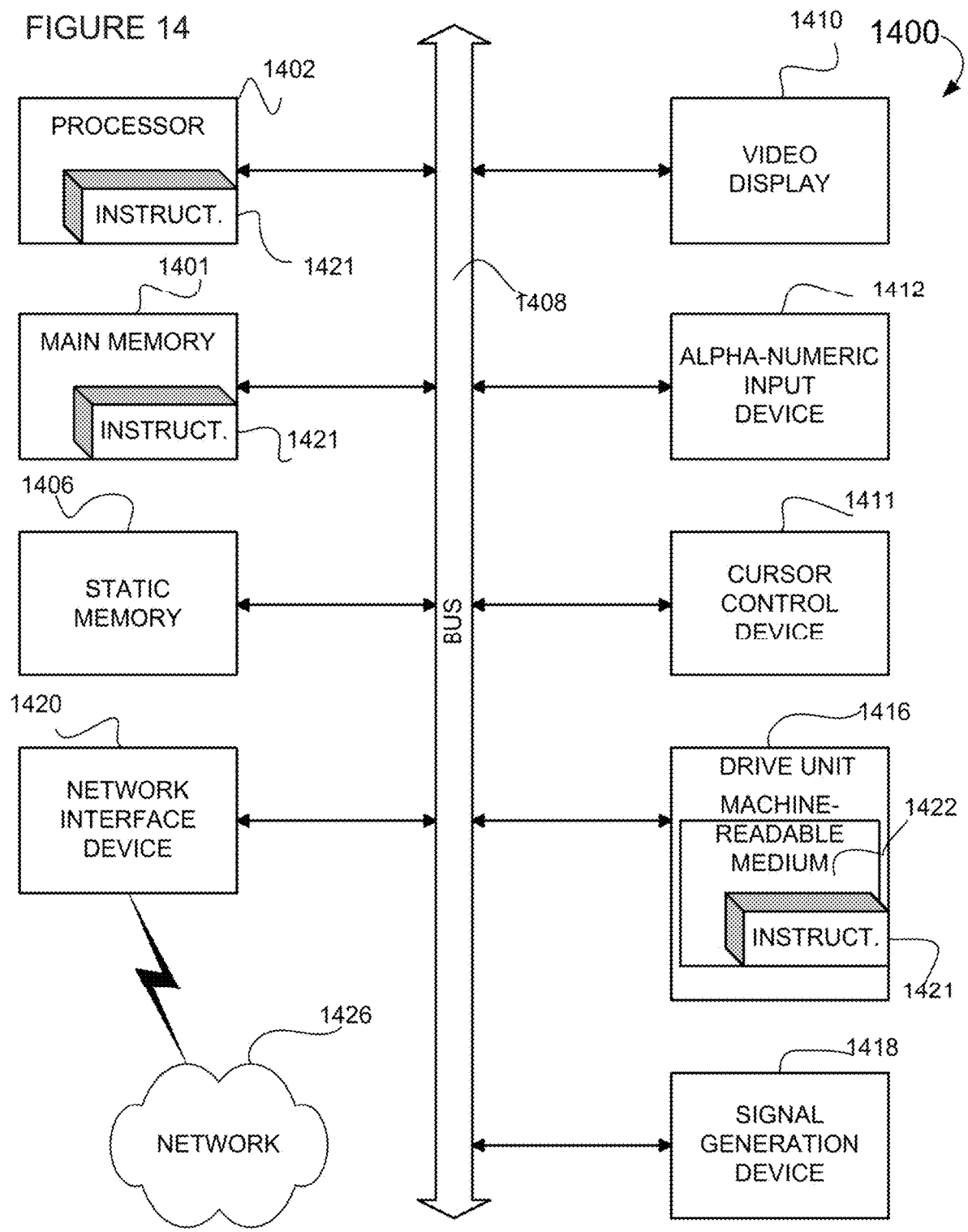
FIG. 14 shows a diagrammatic representation of a machine in the example form of a computer system.

FIG. 14 shows an example diagrammatic representation of machine in the example form of a computer system 1400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Computer system 1400 may include client machines 902 and 903, computer systems 105, or networked system 908.

The example computer system 1400 includes a processor 1402 a Central Processing Unit (CPU), a Graphics Processing Unit (GPU) or both), a main memory 1401 and a static memory 1406, which communicate with each other via a bus 1408. The computer system 1400 may further include a video display unit 1410 (e.g., a Liquid Crystal Display (LCD) or a Cathode Ray Tube (CRT)). The computer system 1400 also includes an alphanumeric input device 1412 (e.g., a keyboard), a User Interface (UI) navigation device (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions (e.g., 1421) and data structures (e.g., software) embodying or utilized by any one or more of the methodologies or functions described herein. The software may also reside, completely or at least partially, within the main memory 1401 and/or within the processor 1402 during execution thereof by the computer system 1400, the main memory 1401 and the processor 1402 also constituting machine-readable media.

The software may further be transmitted or received over a network 1426 via the network interface device 1420 utilizing any one of a number of well-known transfer protocols (e.g., HTTP, HTTPS).

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Marketplace Applications

Example embodiments may be used to facilitate e-commerce using two-factor authentication. For example, a user may obtain a dual token generating fob and use this fob to generate OTP token values for use in e-commerce. A user could, for example, log onto the web site using their password and user ID information. Upon a successful login, a user could then be prompted with an OTP token value in the form of a web page divided into two fields with the first field displaying a plurality of values, such as, for example, 647888, 656888, 702346, 400789, 934377, or some other suitable six-digit value. Seven digits, eight digits, nine digits or some other suitable sized number is used to represent an OTP token value. This same web page may contain a second field containing a text box, scroll down menu, or some other type of suitable object, or widget through which one can select the second OTP token value. Once one successfully logs onto the site using these two OTP token values, one could be free to transact commerce across the Internet. For example, one could purchase goods, services, bid on items, or engage in other financial transactions where the identity of both the user of the system and the identity of the e-commerce by itself would be a prerequisite to the exchange of any type of money, or other types of compensation, for a good or service.

In some embodiments, in addition to using as a dual OTP key fob 104, other types of devices could be used to secure and authenticate access to any data across a network (e.g., the internet). For example, a clock mechanism could be a part of the software in a PDA 102 or cell phone 103 such that the PDA 102 or cell phone 103 could generate two OTP token values that could then be used during the course of engaging in e-commerce. And again, a key fob with a USB plug 506 could be inserted into a USB port. Once inserted, the dual OTP key fob 104 could then generate two OTP values which could then automatically be used to validate one's identity or verify one's identity to an site (e.g., complete both parts of the two-factor-authentication). In the case of using a PDA or a cell phone, one would activate the OTP token value generation algorithm in either one of these devices in order to obtain the two OTP token values. These tokens, in any case, would have to be used within a specified time period. This set time interval of cycle may be 30 seconds, 60 seconds, 90 seconds, or some other suitable period of time. This period of time can be predetermined by the secured authentication site 112 to which the OTP algorithm is synchronized and/or the OTP clock is synchronized, or it could be determined by the site 113 itself. This interval or cycle could be predetermined for each double OTP token device such that when the device is activated, the device's clock would be set to a specific cycle of time (e.g., it would generate token based upon a certain cycle).

In some embodiments, a double OTP token device can be used to transact commerce on an on-line bidding site or e-commerce 113 site such as, for example, the EBAY™ site. Through using this device a user can verify their seller identity to a potential buyer, or conversely, a buyer could authenticate their buyer identity to a potential seller. This would alleviate the need for verification of a buyer/seller through their on-line identity, or selling or buying handle. This token device may additionally then be used to facilitate the actual transaction or sale of goods or services, or buying of goods or services. That is, rather than the device being used merely to identify a buyer or seller on an auction site, such as EBAY™, such a device could be used to transact money across accounts being used during the course of bidding, buying or selling goods or services on such a site.

In some embodiments, a maintainer or a secured verification site 112 of site 113 may manufacture and sell these double OTP token devices. These devices are synchronized with the various authentication servers run by, for example, RSA™ or VERISIGN™ such that, if one would like to transact business on a particular site 113 they must first purchase a double OTP token device from the company maintaining the secured verification site 112.

In some embodiments, the double OTP token device itself contains a login and password prompt wherein a user is first prompted for login and password information prior to being able to access OTP token values.

In terms of power supplies, the double OTP token device is battery powered, whereas in other embodiments as previously mentioned, it is powered via a rechargeable battery wherein the device's USB plug 506 is inserted into a USB port and derives electrical power from this port and also the charging of its battery or batteries via this port.

Some embodiments may include a system including a display operatively coupled to a computer system to view a web page containing a first OTP value, an input device (e.g., a mouse, light pen or other suitable device) operative coupled to the computer system to provide input in the form of a second OTP value, and a transmitter (e.g., a network adaptor card) operatively coupled to the computer system to facilitate transmission of the second OTP value. The system may also include an input device that is used to input the second OTP token value into the web page. Some embodiments may include the system wherein the input device is used to input the second OTP token value into a second web page. The system may include the input device as a double OTP token device that generates the first OTP value, and the second OTP value. Some embodiments may include the system wherein the double OTP token device includes at least one of a group of including a PDA 102, cell phone 103, and dual OTP key fob 105.

A method may be described as including displaying a web page containing OTP token values, comparing a first OTP token value displayed on the web page, with a first OTP token value displayed on a portable device, inputting a second OTP token value displayed on the portable device into the web page, and transmitting the second OTP value. Some embodiments may include the method further comprising generating the first and second OTP token value by passing a first and second clock value through a token algorithm. The method may further include displaying the first OTP token value on a first screen of a portable device, and displaying the second OTP token value on a second screen of a portable device. Some embodiments may include the method further including verifying the second OTP token value by comparing it against an OTP token value received from a third-party verification server. The method further includes proceeding with a transaction once the second OTP token value is verified.

Example embodiments may also include a computer-readable medium having instructions stored thereon for causing a suitably programmed computer to execute a method including displaying a web page containing OTP token values, comparing a first OTP token value displayed on the web page, with a first OTP token value displayed on a portable device, inputting a second OTP token value displayed on the portable device into the web page, and transmitting the second OTP value.

In some embodiments, an apparatus is described as comprising one or more processors to generate a first and second OTP token value by passing a first and second clock value through a token algorithm. Some embodiments may include the apparatus further including a clock operatively coupled to the one or more processors. Example embodiments may also include the apparatus wherein the clock is synchronized with another clock residing on a network. The apparatus may further comprise a display operatively coupled to the one or more processors to show the first OTP token value on a first screen of a portable device, and a display to show the second OTP token value on a second screen of a portable device. Moreover, the apparatus further includes a single screen operatively coupled to the one or more processors to show the first and second OTP token values. The apparatus is described as having the first and second OTP token values to include at least one of a group of including a six digit value, a seven digit value, and an eight digit value. The apparatus further comprises a first button that when pressed generates the first OTP value, and a second button that when pressed generates a second OTP value, wherein the first and second button are operatively coupled to the one or more processors. Additionally, the apparatus can be described as further comprising a key ring to allow the apparatus be operatively coupled to a set of keys.

Some embodiments may include an apparatus comprising means for displaying a web page containing OTP token values, means for comparing a first OTP token value displayed on the web page, with a first OTP token value displayed on a portable device, means for inputting a second OTP token value displayed on the portable device into the web page, and means for transmitting the second OTP value.

A system is illustrated as including an OTP device operatively coupled to a computer system to receive data from the computer system, and a server operatively coupled to the computer system via a network connection, wherein the OTP device includes a device selected from the group consisting of a dual OTP token Device, cell phone, and PDA. Moreover, the data may be current time data. Further, the OTP device may be operatively coupled to the computer system via a USB, wherein the USB transmits and receives data through a Blue Tooth connection.

A method is illustrated as including receiving a request to get current time from an OTP device, transmitting the current time across a network to the OTP device, and updating a clock in the OTP device to reflect the current time. Additionally, the method further includes requesting the current time from an authentication server over a network connection, wherein the network connection is a Blue Tooth connection. Additionally, the method further includes sending a current time request to a first port via the network connection, wherein the current time request is processed by a clock application. Moreover, the method further includes transmitting the current time to a second port.

A computer-readable medium having instructions stored thereon is also illustrated for causing a suitably programmed computer to execute a method including a first set of instructions to receive a request relating to current time from an OTP device, a second set of instructions to transmit the current time to the OTP device, and a third set of instructions to update a clock in the OTP device to reflect the current time.

An apparatus is illustrated comprising one or more processors to generate two or more clock values, pass these two or more clock values through a hashing function to generate two or more OTP tokens, display these two or more OTP tokens on a screen, transmit data through a USB, and receive data through a USB, wherein the one or more processors transmit data through a Blue Tooth enabled transmitter, and receive data through a Blue Tooth enabled receiver. Further, the apparatus may include the one or more processors receiving electrical power through the USB, wherein the one or more processors control the recharging of one or more batteries. Additionally, the apparatus may include the one or more processors controlling the use of one or more buttons used to obtain two or more OTP tokens.

A method is illustrated as including initiating a TCP/IP connection, requesting a current time, receiving the current time, and updating a clock to reflect the current time. Additionally, the method may include sending the current time request to a specific port, receiving the current time request by a clock application, and transmitting the current time to a port.

An apparatus is illustrated as including means for initiating a TCP/IP connection, means for requesting a current time, means for receiving the current time, and means for updating a clock to reflect the current time.

It is to be understood that the above illustration is intended to be illustrative, and not restrictive. Although numerous characteristics and advantages of various embodiments as described herein have been set forth in the foregoing illustration, together with details of the structure and function of various embodiments, many other embodiments and changes to details is apparent to those of skill in the art upon reviewing the above illustration. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. § 1.72(b), requiring an abstract that may allow the reader to quickly ascertain the nature of the technical disclosure. It is submitted with the understanding that it may not be used to interpret or limit the scope or meaning of the claims. In addition, in the foregoing Detailed illustration, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Illustration, with each claim standing on its own as a separate embodiment.

What is claimed is:

1. A method comprising:
   accessing, by a computing device of a user, a server of a site;
   in response to the accessing, receiving a list of token values including a first token value generated by an authentication server and at least one further random value;
   causing, by a hardware processor of the computing device, display of the list of token values in a first field of a user interface, the list of token values to be compared to a first token value associated with the computing device to determine whether the first token value associated with the computing device is presented in the list of token values, a match in the first token value associated with the computing device to the first token value in the list of token values providing authentication of the server of the site at the computing device;
   receiving, in a second field of the user interface, a second token value comprising a hashing of a clock value generated based on a clock of a password device associated with the computing device, the receiving of the second token value being in response to the match in the first token value associated with the computing device to the first token value in the list of token values, wherein the clock of the password device is synchronized with a clock of the authentication server; and
   transmitting the second token value associated with the computing device, the second token value being used to authenticate the user at the server of the site.

2. The method of claim 1, wherein the user interface comprises a web page of the site.

3. The method of claim 1, wherein:
   the accessing the server of the site comprises transmitting login information to the server of the site; and
   the receiving of the list of token values is in response to verification of the login information.

4. The method of claim 1, wherein the second field comprises a text box or a drop-down menu.

5. The method of claim 1, wherein the first token value associated with the computing device is obtained via the password device.

6. The method of claim 1, further comprising accessing an encryption engine that encrypts and decrypts data, including token values, communicated between the computing device and the server.

7. The method of claim 1, wherein the clock associated with the password device and the clock associated with the server are the same clock.

8. A system comprising:
   one or more hardware processors; and
   a storage device storing instructions that, when executed by the one or more hardware processors, causes the one or more hardware processors to perform operations comprising:
   accessing a server of a site;
   in response to the accessing, receiving a list of token values including a first token value generated by an authentication server and at least one further random value;
   causing display of the list of token values in a first field of a user interface, the list of token values to be compared to a first token value associated with the computing device to determine whether the first token value associated with the computing device is presented in the list of token values, a match in the first token value associated with the computing device to the first token value in the list of token values providing authentication of the server of the site at the computing device;
   receiving, in a second field of the user interface, a second token value comprising a hashing of a clock value generated based on a clock of a password device associated with the computing device, the receiving of the second token value being in response to the match in the first token value associated with the computing device to the first token value in the list of token values, wherein the clock of the password device is synchronized with a clock of the authentication server; and
   transmitting the second token value associated with the computing device, the second token value being used to authenticate a user at the server of the site.

9. The system of claim 8, wherein the user interface comprises a web page of the site.

10. The system of claim 8, wherein:
the accessing the server of the site comprises transmitting login information to the server of the site; and
the receiving of the list of token values is in response to verification of the login information.

11. The system of claim 8, wherein the second field comprises a text box or a drop-down menu.

12. The system of claim 8, wherein the first token value associated with the computing device is obtained via the password device.

13. The system of claim 8, further comprising accessing an encryption engine that encrypts and decrypts data, including token values, communicated between the computing device and the server.

14. The system of claim 8, wherein the clock associated with the password device and the clock associated with the server are the same clock.

15. A non-transitory machine-readable medium storing instructions that, when executed by one or more hardware processors of a machine, causes the machine to perform operations comprising:
accessing a server of a site;
in response to the accessing, receiving a list of token values including a first token value generated by an authentication server and at least one further random value;
causing display of the list of token values in a first field of a user interface, the list of token values to be compared to a first token value associated with the computing device to determine whether the first token value associated with the computing device is presented in the list of token values, a match in the first token value associated with the computing device to the first token value in the list of token values providing authentication of the server of the site at the computing device;
receiving, in a second field of the user interface, a second token value that is a hashing of a clock value generated based on a clock associated with a password device associated with the computing device, the receiving of the second token value being in response to the match in the first token value associated with the computing device to the first token value in the list of token values, wherein the clock associated with the password device is synchronized with a clock associated with the authentication server; and
transmitting the second token value associated with the computing device, the second token value being used to authenticate a user at the server of the site.

16. The non-transitory machine-readable medium of claim 15, wherein the user interface comprises a web page of the site.

17. The non-transitory machine-readable medium of claim 15, wherein:
the accessing the server of the site comprises transmitting login information to the server of the site; and
the receiving of the list of token values is in response to verification of the login information.

18. The non-transitory machine-readable medium of claim 15, wherein the second field comprises a text box or a drop-down menu.

19. The non-transitory machine-readable medium of claim 15, wherein the first token value associated with the computing device is obtained via the password device.

20. The non-transitory machine-readable medium of claim 15, further comprising accessing an encryption engine that encrypts and decrypts data, including token values, communicated between the computing device and the server.

* * * * *